United States Patent
Cho et al.

(10) Patent No.: US 12,418,614 B2
(45) Date of Patent: Sep. 16, 2025

(54) ELECTRONIC DEVICE FOR DETECTING SPAM CALL AND METHOD OF OPERATING THE SAME

(71) Applicant: SAMSUNG ELECTRONICS CO., LTD., Suwon-si (KR)

(72) Inventors: Jungil Cho, Suwon-si (KR); Jaewoo Seo, Suwon-si (KR); Choonghoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 18/117,718

(22) Filed: Mar. 6, 2023

(65) Prior Publication Data

US 2023/0308543 A1    Sep. 28, 2023

Related U.S. Application Data

(63) Continuation of application No. PCT/KR2023/001472, filed on Feb. 1, 2023.

(30) Foreign Application Priority Data

Mar. 23, 2022    (KR) .................. 10-2022-0036287

(51) Int. Cl.
 *H04M 3/00* (2024.01)
 *H04M 3/42* (2006.01)
 *H04M 3/436* (2006.01)

(52) U.S. Cl.
 CPC ..... *H04M 3/4365* (2013.01); *H04M 3/42357* (2013.01)

(58) Field of Classification Search
 CPC ........... H04M 3/4365; H04M 3/42357; H04M 3/2218; H04M 3/436; H04M 3/42263;
 (Continued)

(56) References Cited

U.S. PATENT DOCUMENTS

| 4,256,926 A | 3/1981 | Pitroda et al. |
| 4,797,911 A | 1/1989 | Szlam et al. |

(Continued)

FOREIGN PATENT DOCUMENTS

| CN | 107819924 A | 3/2018 |
| CN | 109451183 B | 1/2021 |

(Continued)

OTHER PUBLICATIONS

International Search Report dated May 12, 2023 for PCT/KR2023/001472.

(Continued)

*Primary Examiner* — Pakee Fang
(74) *Attorney, Agent, or Firm* — Nixon & Vanderhye P.C.

(57) ABSTRACT

A server may include a communication circuit and at least one processor. The at least one processor may be connected to a first electronic device and a second electronic device, using the communication circuit, and may be configured to: obtain first call log information including at least one outgoing call made using a call function of the first electronic device by the second electronic device, determine whether the second electronic device satisfies a first condition for determining that the second electronic device is a spam caller, based on the first call log information, search for one or more external electronic devices located around the second electronic device, based on the first condition being satisfied, obtain second call log information about the one or more external electronic devices, and determine at least one of the one or more external electronic devices or the second electronic device as a spam caller, based on the second call log information.

16 Claims, 14 Drawing Sheets

(58) Field of Classification Search
CPC ... H04M 2203/558; H04M 2203/6027; H04M 3/42348
See application file for complete search history.

(56) References Cited

U.S. PATENT DOCUMENTS

| | | | |
|---|---|---|---|
| 4,905,302 A | 2/1990 | Childress et al. |
| 4,939,746 A | 7/1990 | Childress |
| 5,010,459 A | 4/1991 | Taylor et al. |
| 5,029,199 A | 7/1991 | Jones et al. |
| 5,095,500 A | 3/1992 | Tayloe et al. |
| 5,163,131 A | 11/1992 | Row et al. |
| 5,187,787 A | 2/1993 | Skeen et al. |
| 5,239,294 A | 8/1993 | Flanders et al. |
| 5,392,287 A | 2/1995 | Tiedemann, Jr. et al. |
| 5,410,703 A | 4/1995 | Nilsson et al. |
| 5,557,798 A | 9/1996 | Skeen et al. |
| 5,594,782 A | 1/1997 | Zicker et al. |
| 5,825,867 A | 10/1998 | Epler et al. |
| 5,960,064 A | 9/1999 | Foladare et al. |
| 6,085,086 A | 7/2000 | La Porta et al. |
| 6,141,565 A | 10/2000 | Feuerstein et al. |
| 6,327,418 B1 | 12/2001 | Barton |
| 6,404,746 B1 | 6/2002 | Cave et al. |
| 6,546,425 B1 | 4/2003 | Hanson et al. |
| 6,611,498 B1 | 8/2003 | Baker et al. |
| 6,686,838 B1 | 2/2004 | Rezvani et al. |
| 6,728,713 B1 | 4/2004 | Beach et al. |
| 6,782,264 B2 | 8/2004 | Anderson |
| 6,807,165 B2 | 10/2004 | Belcea |
| 6,981,047 B2 | 12/2005 | Hanson et al. |
| 7,106,843 B1 | 9/2006 | Gainsboro et al. |
| 7,233,933 B2 | 6/2007 | Horvitz et al. |
| 7,271,765 B2 | 9/2007 | Stilp et al. |
| 7,319,397 B2 | 1/2008 | Chung et al. |
| 7,474,741 B2 | 1/2009 | Brunson et al. |
| 7,525,484 B2 | 4/2009 | Karr et al. |
| 7,587,465 B1 | 9/2009 | Muchow |
| 7,613,287 B1 | 11/2009 | Stifelman et al. |
| 7,613,822 B2 | 11/2009 | Joy et al. |
| 7,629,890 B2 | 12/2009 | Sullivan et al. |
| 7,634,528 B2 | 12/2009 | Horvitz et al. |
| 7,636,428 B2 | 12/2009 | Brahm et al. |
| 7,769,000 B2 | 8/2010 | Buckley |
| 7,827,047 B2 | 11/2010 | Anderson et al. |
| 7,844,666 B2 | 11/2010 | Horvitz et al. |
| 7,861,924 B1 | 1/2011 | Block et al. |
| RE42,285 E | 4/2011 | Anderson et al. |
| 7,995,565 B2 | 8/2011 | Buckley et al. |
| 8,023,937 B2 | 9/2011 | Fok et al. |
| 8,046,837 B2 | 10/2011 | Takashima |
| 8,126,441 B2 | 2/2012 | Beyer, Jr. |
| 8,130,205 B2 | 3/2012 | Forstall et al. |
| 8,140,116 B2 | 3/2012 | Yew et al. |
| 8,165,993 B2 | 4/2012 | Broda et al. |
| 8,166,263 B2 | 4/2012 | Prahlad et al. |
| 8,238,905 B2 | 8/2012 | Jiang |
| 8,255,223 B2 | 8/2012 | Wang |
| 8,255,651 B2 | 8/2012 | Liu et al. |
| 8,271,025 B2 | 9/2012 | Brisebois et al. |
| 8,331,907 B2 | 12/2012 | Jiang |
| 8,340,626 B2 | 12/2012 | Edge |
| 8,340,627 B2 | 12/2012 | Edge |
| 8,365,138 B2 | 1/2013 | Iborra et al. |
| 8,385,975 B2 | 2/2013 | Forutanpour et al. |
| 8,397,168 B2 | 3/2013 | Leacock et al. |
| 8,447,231 B2 | 5/2013 | Bai et al. |
| 8,467,519 B2 | 6/2013 | Odinak et al. |
| 8,503,650 B2 | 8/2013 | Reding et al. |
| 8,527,903 B2 | 9/2013 | Chaudhri et al. |
| 8,537,695 B2 | 9/2013 | Wiley et al. |
| 8,619,669 B2 | 12/2013 | Song |
| 8,627,127 B2 | 1/2014 | Mucignat et al. |
| 8,627,237 B2 | 1/2014 | Chaudhri et al. |
| 8,640,057 B2 | 1/2014 | Chaudhri et al. |
| 8,681,177 B2 | 3/2014 | Tsujimoto |
| 8,704,863 B2 | 4/2014 | Santamaria et al. |
| 8,751,667 B2 | 6/2014 | Santamaria et al. |
| 8,831,014 B2 | 9/2014 | Koodli et al. |
| 8,849,858 B2 | 9/2014 | Lim |
| 8,949,456 B2 | 2/2015 | Mousseau et al. |
| 8,958,917 B2 | 2/2015 | Wolfe et al. |
| 9,081,501 B2 | 7/2015 | Asaad et al. |
| 9,141,718 B2 | 9/2015 | Forstall et al. |
| 9,191,486 B2 | 11/2015 | Tseng et al. |
| 9,213,421 B2 | 12/2015 | Langlois et al. |
| 9,286,616 B2 | 3/2016 | Kilar et al. |
| 9,288,315 B2 | 3/2016 | Salonen |
| 9,300,772 B2 | 3/2016 | Kim |
| 9,396,354 B1 | 7/2016 | Murphy et al. |
| 9,462,022 B2 | 10/2016 | Chan et al. |
| 9,479,341 B2 | 10/2016 | Bugenhagen et al. |
| 9,531,775 B2 | 12/2016 | Chan et al. |
| 9,536,310 B1 | 1/2017 | Kusens |
| 9,600,594 B2 | 3/2017 | Greenberg et al. |
| 9,619,038 B2 | 4/2017 | Rydenhag et al. |
| 9,774,410 B2 | 9/2017 | Daoura et al. |
| 9,785,796 B1 | 10/2017 | Murphy et al. |
| 9,887,887 B2 | 2/2018 | Hunter et al. |
| 9,913,300 B2 | 3/2018 | Ayyasamy et al. |
| 10,019,057 B2 | 7/2018 | Osman et al. |
| 10,102,250 B2 | 10/2018 | Deshmukh et al. |
| 10,291,770 B2 * | 5/2019 | Bocking ............... H04W 4/12 |
| 10,684,350 B2 | 6/2020 | Dupray et al. |
| 10,965,809 B2 | 3/2021 | Kats |
| 2008/0075250 A1 * | 3/2008 | Kent ................ H04M 3/02 379/133 |
| 2014/0179294 A1 * | 6/2014 | Liu ................ H04M 3/54 455/417 |
| 2016/0142540 A1 | 5/2016 | Hickey et al. |
| 2016/0381213 A1 | 12/2016 | Murynets et al. |
| 2017/0171384 A1 | 6/2017 | Ghuli et al. |
| 2021/0306456 A1 * | 9/2021 | Kanagala ........... H04M 3/4365 |
| 2023/0199112 A1 * | 6/2023 | Kakkar ................ G16H 40/20 |
| 2023/0239400 A1 * | 7/2023 | Trim ................ H04M 3/42059 704/231 |

FOREIGN PATENT DOCUMENTS

| | | |
|---|---|---|
| EP | 3 758 323 A1 | 12/2020 |
| JP | 2005-184151 A | 7/2005 |
| KR | 10-2016-0022154 A | 2/2016 |
| KR | 10-2017-0009222 A | 1/2017 |
| KR | 10-2018-0006775 A | 1/2018 |
| KR | 10-1870789 B1 | 6/2018 |
| KR | 10-2021-0055557 A | 5/2021 |
| KR | 10-2021-0115807 A | 9/2021 |
| KR | 10-2022-0021584 A | 2/2022 |

OTHER PUBLICATIONS

PCT Written Opinion dated May 12, 2023 for PCT/KR2023/001472.

Extended European Seach Report dated Feb. 18, 2025 for EP Application No. 23775148.2.

* cited by examiner

ELECTRONIC DEVICE FOR DETECTING SPAM CALL AND METHOD OF OPERATING THE SAME

CROSS REFERENCE TO RELATED APPLICATIONS

This application is a continuation of International Application No. PCT/KR2023/001472, filed on Feb. 1, 2023, designating the United States, in the Korean Intellectual Property Receiving Office, and claiming priority to Korean patent application number 10-2022-0036287 filed on Mar. 23, 2022, the disclosures of which are all hereby incorporated by reference herein in their entireties.

BACKGROUND

Field

Certain example embodiments relate to an electronic device for detecting a spam call and/or a method of operating the same.

Description of Related Art

A communication business operator such as a wireless network, a voice call provider, or a messaging server may provide a messaging service or a voice call service over a packet-based network. Some users may abuse these services in an undesirable manner, for example, to transmit voice calls or a large number of messages (e.g., spam calls or spam messages) that receivers do not intend or want to receive.

Marketing strategies of transmitting calls or messages with promotional content such as an advertisement to electronic devices (e.g., smartphones) possessed by individuals have been actively carried out in recent years, and communication services of electronic devices may be misused even in crimes such as voice phishing.

SUMMARY

Accordingly, various techniques of detecting spam data (e.g., spam calls or spam messages) by monitoring calls or messaging are under study.

Some electronic devices may be connected to each other based on the same user account to provide a user with call and message continuity between the electronic devices.

For example, a smartphone and a tablet (or a wearable devices such as a smart watch) that share the same user account may be connected to their respective communication networks (e.g. a cellular network or wireless fidelity (WiFi)), and the smartphone may operate as a primary device with a subscriber identity module (SIM), whereas the tablet may operate as a secondary device without a SIM. A user may receive a call made to the smartphone on the tablet, and check a text message (e.g., a short messaging service (SMS) or a multimedia messaging service (MMS)) received in the smartphone on the tablet. In another example, the user may make a call or transmit a text message through the tablet, using the phone number of the smart phone.

A plurality of electronic devices (e.g., which may include a primary device and a secondary device) that are associated with each other based on a user account may be abused to transmit calls or messages for illegal or malicious purposes. In an example, a malicious user may place a primary device in one country and use a secondary device located in another country to make spam calls and/or transmit spam messages. Since the other party (or a message recipient) receives a call (or message) from the phone number (e.g., domestic number) of the primary device, the other party may not suspect or recognize the maliciousness of the caller (or message sender).

Blocking the call and message continuity function of electronic devices (e.g., secondary devices) located in a designated country to solve this problem may reduce user experiences and thus cause inconvenience to users.

In certain example embodiments, a spam caller who makes a spam call and/or transmits a spam message may be detected based on call log information of an electronic device and information about nearby devices.

In certain example embodiments, a user account used for a malicious action (e.g., spam calls and/or spam messaging) may be detected based on call log information of a plurality of electronic devices associated with each other based on the same user account.

In certain example embodiments, at least one of a plurality of electronic devices that provide call and message continuity may detect at least one external electronic device used for a malicious action by using call log information of nearby external electronic devices.

A server according to an example embodiment may include a communication circuit, and at least one processor. The at least one processor may be connected, directly or indirectly, to a first electronic device and a second electronic device, using the communication circuit. The at least one processor (comprising processing circuitry) may be configured to obtain first call log information including at least one outgoing call made using a call function of the first electronic device by the second electronic device. The at least one processor may be configured to determine whether the second electronic device satisfies a first condition for determining that the second electronic device is a spam caller, based on the first call log information. The at least one processor may be configured to search for one or more external electronic devices located around the second electronic device, based on the first condition being satisfied. The at least one processor may be configured to obtain second call log information about the one or more external electronic devices. The at least one processor may be configured to determine at least one of the one or more external electronic devices or the second electronic device as a spam caller, based on the second call log information.

An operation method of a server according to an example embodiment may include obtaining first call log information including at least one outgoing call made using a call function of a first electronic device by a second electronic device connected, directly or indirectly, to the server. The method may include determining whether the second electronic device satisfies a first condition for determining that the second electronic device is a spam caller, based on the first call log information. The method may include searching for one or more external electronic devices located around the second electronic device, based on the first condition being satisfied. The method may include obtaining second call log information about the one or more external electronic devices. The method may include determining at least one of the one or more external electronic devices or the second electronic device as a spam caller, based on the second call log information.

BRIEF DESCRIPTION OF THE DRAWINGS

The foregoing and other features of example embodiments will become more apparent from the following detailed description of embodiments when read in conjunction with the accompanying drawings. In the drawings, like reference numerals refer to like elements.

DETAILED DESCRIPTION

Figure 1:
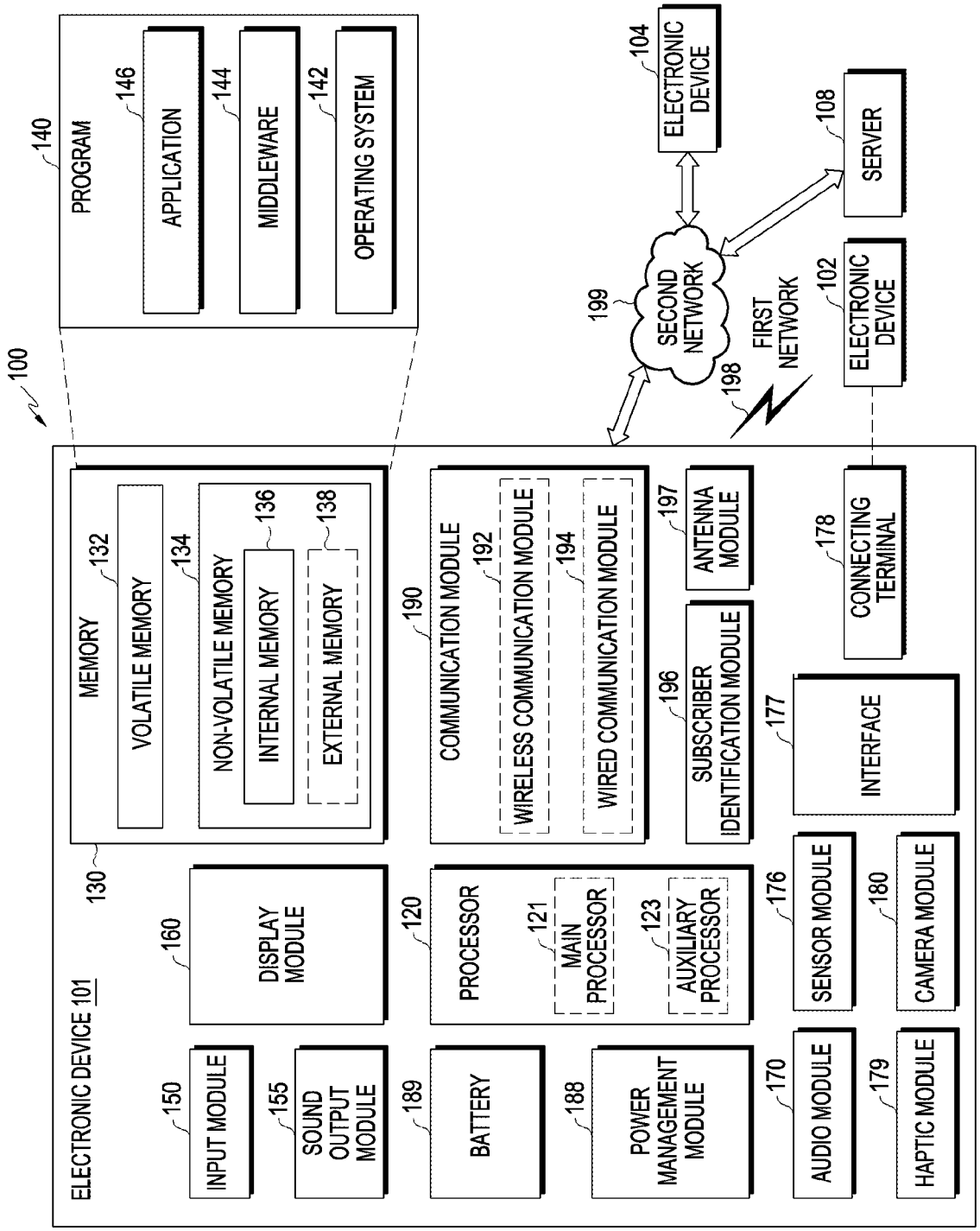
FIG. 1 is a block diagram illustrating an electronic device in a network environment according to various example embodiments.

Certain example embodiments will be described below with reference to the attached drawings. Lest it should obscure the subject matter of the disclosure, a detailed description of a generally known function or structure of the disclosure will be avoided. Although the terms as described later are defined in consideration of functions in the disclosure, the terms may be changed according to the intention of a user or an operator, or customs. Therefore, the definitions should be made by the meaning of each term lying within.

The technical terms as used in the disclosure are provided merely to describe embodiments, not intended to limit the scope of the disclosure. Further, unless otherwise defined, the technical terms as used in the disclosure should be interpreted as the same meanings as generally understood by those skilled in the art, and should not be interpreted as excessively inclusive or excessively narrow meanings. In addition, when the technical terms used in the disclosure are incorrect ones that do not accurately express the subject of the disclosure, they should be understood by being replaced with technical terms that can be correctly understood by those skilled in the art. In addition, the general terms used in the disclosure should be interpreted as defined in dictionaries or according to the context, and should not be interpreted as excessively narrow meanings.

Singular forms used in the disclosure include plural referents unless the context clearly dictates otherwise. In this application, the term "have", "may have", "include", or "may include" should not be interpreted as necessarily including multiple components or steps described in the specification, and should be interpreted as excluding some of the components or steps or further including additional components or steps.

Further, the terms including first or second as used in the disclosure may be used to describe various components, and the components should not be limited by the terms. The terms are used only for the purpose of distinguishing one component from another. For example, a first component may be called a second component, and vice versa without departing from the scope of the disclosure.

When it is said that a component is "connected to" or "coupled to" another component, the component may be connected or coupled to the other component directly or with a third component in between. On the other hand, when it is said that a component is "directly connected to" or "directly coupled to" another component, it should be understood that there is no third component in between.

It should be noted that the attached drawings are presented merely to help understanding of the subject of the disclosure, and should not be construed as limiting the subject of the disclosure. The subject of the disclosure should be interpreted as encompassing all modifications, equivalents, and alternatives in addition to the attached drawings.

Although a mobile station will be described below with reference to the drawings, the mobile station may also be referred to as an electronic device, a terminal, a mobile equipment (ME), a user equipment (UE), a user terminal (UT), a subscriber station (SS), a wireless device, a handheld device, or an access terminal (AT). In addition, the mobile station may be a device equipped with a communication function, such as a portable phone, a personal digital assistant (PDA), a smartphone, a wireless modem, or a laptop computer.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensatiue or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-nearby communication scheme (e.g., a bus, general purpose input and output (GPIO), serial nearby interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Terms used to describe various embodiments may be as follows.

In various embodiments, a first electronic device (e.g., the electronic device 101 of FIG. 1) may be a device capable of using a call function (and a message transmission and reception function) by connecting to a wireless communication network (e.g., the first network 198 (a short-range wireless communication network) or the second network 199 (a long-range wireless communication network) of FIG. 1). For example, the first electronic device may be a device including a SIM. The first electronic device may be a primary device that provides call and message continuity to a second electronic device.

In various embodiments, the second electronic device (e.g., the electronic device 102 of FIG. 1) may be an external electronic device connected to a network (e.g., the first network 198 (the short-range wireless communication network) or the second network 199 (the long-range wireless communication network) of FIG. 1). For example, the second electronic device may not include a SIM. The second electronic device may be a secondary device that provides call and message continuity by using the call function of the first electronic device.

In an embodiment, aside from the use of the call and message continuity function through the first electronic device, the second electronic device may connect to a network (e.g., the first network 198 (the short-range wireless communication network) or the second network 199 (the long-range wireless communication network) of FIG. 1) and use the call function. For example, the second electronic device (e.g., a tablet) may communicate with the first electronic device, using short-range wireless communication (e.g., wireless fidelity (WiFi)). In another example, the second electronic device (e.g., the tablet) may connect to a network (e.g., the second network 199 (the long-range wireless communication network) of FIG. 1), using short-range wireless communication (e.g., WiFi).

A device with a SIM may be set as a primary device of a communication group. A device without a SIM may be set as a secondary device of the communication group.

For example, at least one of the first electronic device or the second electronic device may be a portable communication device (e.g., a smartphone), a wearable device (e.g., a smart watch), a portable computer (e.g., a tablet or a laptop), a computer, or a smart home appliance (e.g., a smart TV).

In an embodiment, a communication group may be a group of one first electronic device and at least one second electronic device connected, directly or indirectly, to the first electronic device. Communication between the second electronic device that is not connected to a network (e.g., the second network 199 (the long-range wireless communication network) of FIG. 1) and the network may be relayed by the first electronic device. The first electronic device and the second electronic device may be connected through, for example, a second network (e.g., the first network 198 (the short-range wireless communication network) of FIG. 1).

In an embodiment, a phone number may be registered in one user account, and a communication group including a first electronic device and at least one second electronic device may be set in correspondence with the phone number. The phone number may be used as a group identifier (ID) identifying the communication group.

In an embodiment, the call and message continuity function may be a function or service of relaying communication between a first electronic device connected to a network (e.g., the second network 199 (the long-distance wireless communication network) of FIG. 1) and a second electronic device that is not connected to the network (e.g., the second network 199 (the long-distance wireless communication network) of FIG. 1). For example, the call and message continuity function may support a plurality of electronic devices (e.g., a primary device and at least one secondary device) to communicate using one phone number. The call and message continuity function may provide communication continuity between the electronic devices by connecting the at least one secondary device to the primary device. The call and message continuity function may synchronize calls and messages between a plurality of electronic devices connected to each other.

The call and message continuity function may include, for example, at least one of call forking, call transfer, message (e.g., short messaging service (SMS) message, multimedia messaging service (MMS) message, or social networking service (SNSN) message) synchronization, or call log synchronization. A call may include at least one of a voice call, a video call, a media call (e.g., an IP multimedia subsystem (IMS) call), or a relay call. For example, call forking may include phone conversation relay.

Call forking may include a function of invoking a phone call at one phone number for a call request and ringing or vibrating multiple (e.g., two) electronic devices (e.g., a primary device and at least one secondary device). For example, when one of the electronic devices answers a call, a cancellation message may be transmitted to stop the call request for the other electronic device(s).

In various embodiments, the call and message continuity function may be a function of relaying a call between a first electronic device (e.g., a primary device) and an external electronic device (e.g., the electronic device 104 of FIG. 1) that are connected to a network (e.g., the second network 199 (the long-range wireless communication network) of FIG. 1) to a second electronic device (e.g., a secondary device) not connected to the network to provide the call between the second electronic device and the external electronic device.

For example, a second electronic device registered to a server (e.g., a service server) may receive a call which has been made from the external electronic device to the first electronic device through the network (e.g., the second network 199 (the long-distance wireless communication network) of FIG. 1), or call the external electronic device through the first electronic device. In another example, the first electronic device may forward media (voice and/or video) received from the external electronic device to the second electronic device, and forward media (voice and/or video) received from the second electronic device to the external electronic device. The first electronic device and the second electronic device may be connected, directly or indirectly, to each other through a first network (e.g., the second network 199 (the long-range wireless communication network such as a cellular network) of FIG. 1) or a second network (e.g., the first network 198 (the short-range wireless communication network such as Wi-Fi) of FIG. 1).

Message synchronization may include a function of transmitting a message (e.g., SMS/MMS/SNSN message) transmitted to one phone number to a plurality of electronic devices (e.g., a primary device and at least one secondary device). Message synchronization may include a function of sharing or synchronizing message logs between the plurality of electronic devices (e.g., the primary device and the at least one secondary device). Message transmission and reception between an external electronic device and the first electronic device through a network may be relayed to the second electronic device. The second electronic device may transmit and receive a message through the first electronic device.

Call log synchronization may include a function of sharing or synchronizing their respective call logs between a plurality of electronic devices (e.g., a primary device and at least one secondary device). A call log stored in a first electronic device may be transmitted to a second electronic device, and the second electronic device may check the call log. The second electronic device may transmit or receive a call through the first electronic device.

In various embodiments, the call and message continuity function may be provided to a plurality of electronic devices (e.g., a primary device and at least one secondary device) registered in one communication group. For example, the plurality of electronic devices in the communication group may communicate with an external electronic device based on the same phone number. For example, at least one phone number may be registered in a user account, and at least one communication group corresponding to each phone number may be set. Each communication group may include a first electronic device (e.g., primary device) and at least one second electronic device (e.g., secondary device).

Communication group setting may be at least one of group creation, group addition, device addition, group update, group deletion, or device deletion.

For example, in the case where the user purchases or activates the first electronic device and then intends to use a communication relay function in the first electronic device, when the communication relay function is initially activated in the first electronic device, group addition (creation/addition of a communication group) may be performed.

For example, in the case where the user purchases or activates the second electronic device and then connects the second electronic device to the first electronic device to use the communication relay function, when the communication relay function is initially activated in the second electronic device, device addition (addition of a device in a communication group) may be performed.

For example, in the case where the user moves a SIM (e.g., a SIM card) from an existing electronic device (a previous primary device) to a new electronic device, and sets the new electronic device as a new primary device, when the user intends to change the name of a communication group or the activation state of the communication relay function of the communication group, group update (communication group update) may be performed.

For example, group deletion (deletion of a communication group) may be performed, when the user leaves the account or wants to withdraw from the communication relay function of a communication group (e.g., when the user changes a phone number).

For example, device deletion (deletion of a device within a communication group) may be performed, when the user deletes a device belonging to one communication group from the communication group (e.g., when the first electronic device connected to the second electronic device is changed).

Figure 2:
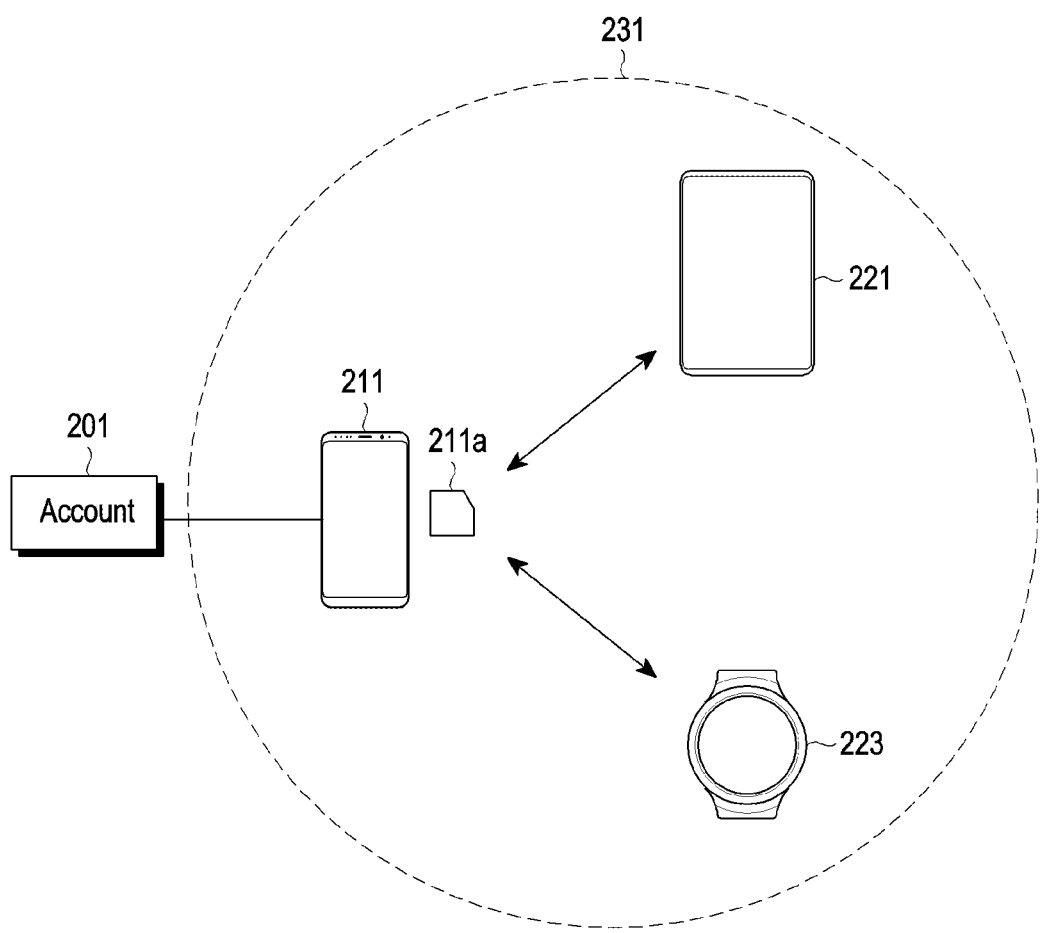
FIG. 2 is a diagram illustrating an exemplary phone number-based communication group according to an example embodiment.

FIG. 2 is a diagram illustrating an exemplary phone number-based communication group according to an embodiment.

Referring to FIG. 2, a phone number corresponding to a SIM 211*a* may be registered in a user account 201, and a communication group 231 may be set in correspondence with the phone number. The communication group 231 may include a first electronic device 211 and at least one second electronic device (e.g., second electronic device 1 221 or second electronic device 2 223). The call and message continuity function based on the same phone number may be provided within the communication group 231.

The first electronic device 211 may include a SIM 211*a* (e.g., a SIM card) corresponding to the phone number. The SIM 211*a* may be the SIM 196 of FIG. 1.

For example, a user may register second electronic device 1 221 (e.g., a tablet or a watch) and/or second electronic device 2 223 (e.g., a tablet or a watch) in the communication group 231 set based on the phone number registered in the user account 201. According to an embodiment, second electronic device 1 221 and/or second electronic device 2 223 may not include any SIM. In an embodiment, the first electronic device 211 may be located in the same space as or a space (e.g., a room, a building, or a country) separated from second electronic device 1 221 and/or second electronic device 2 223. The first electronic device 211 may be connected to a first network (e.g., the first network 198) or a second network (e.g., the second network 199). Likewise, second electronic device 1 221 and/or second electronic device 2 223 may be connected, directly or indirectly, to the first network (e.g., the first network 198) or the second network (e.g., the second network 199).

The user may make a call using at least one of second electronic device 1 221 or second electronic device 2 223, and the call may be transferred to a peer electronic device by the first electronic device 211. An incoming call received from the peer electronic device may be transferred to second electronic device 1 221 or second electronic device 2 223 by the first electronic device 211, and when any of the first electronic device 211, second electronic device 1 221, and second electronic device 2 223 answers the incoming call, an incoming call notification (e.g., ringing) may stop in the other devices.

Figure 3:
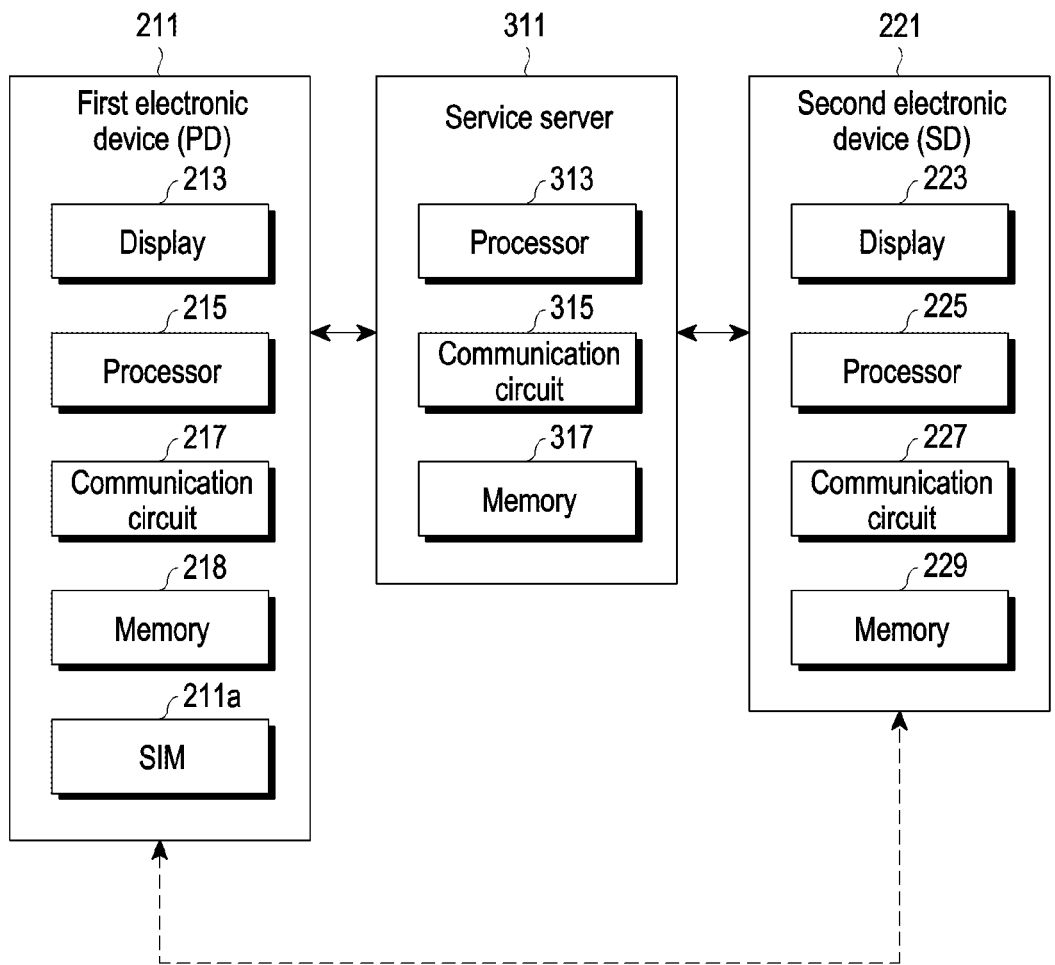
FIG. 3 is a block diagram illustrating a connection between a first electronic device and a second electronic device according to an example embodiment.

FIG. 3 is a block diagram illustrating a connection between a first electronic device and a second electronic device according to an embodiment. In certain example embodiments, the first electronic device 211 or the second electronic device 221 may include all or part of the electronic device 101 illustrated in FIG. 1.

Referring to FIG. 3, the first electronic device 211 may include the SIM 211*a* and directly connect to a first network (e.g., the second network 199 (the long-range wireless communication network) of FIG. 1) without communication relay. In an embodiment, the first electronic device 211 and the second electronic device 221 may communicate with a service server 311 through the first network (e.g., the second network 199 (the long-range wireless communication network) of FIG. 1) or a second network (e.g., the first network 198 (the short-range wireless communication network) of FIG. 1). For example, the first electronic device 211 may communicate with the service server 311 through the first network (e.g., the second network 199 (the long-range wireless communication network) of FIG. 1) or the second network (e.g., the first network 198 (the short-range wireless communication network) of FIG. 1), and the second electronic device 221 may communicate with the service server 311 through the second network (e.g., the first network 198 (the short-range wireless communication network) of FIG. 1). In an embodiment, the second electronic device 221 may be connected to the first electronic device 211 using WiFi or Bluetooth, and communicate with the service server 311 through the first electronic device 211.

The service server 311 may include a processor 313 (e.g., the processor 120 of FIG. 1, comprising processing circuitry), a communication circuit 315 (e.g., the communication module 190 of FIG. 1), and memory 317 (e.g., the memory 130 of FIG. 1).

The first electronic device 211 may include a display 213 (e.g., the display module 160 of FIG. 1 comprising at least one display), a processor 215 (e.g., the processor 120 of FIG. 1), a communication circuit 217 (e.g., the communication module 190 of FIG. 1 comprising communication circuitry), memory 218 (e.g., the memory 130 of FIG. 1), and the SIM 211a (e.g., the SIM 196 of FIG. 1).

The second electronic device 221 may include a display 223 (e.g., the display module 160 of FIG. 1), a processor 225 (e.g., the processor 120 of FIG. 1), a communication circuit 227 (e.g., the communication module 190 of FIG. 1), and memory 229 (e.g., the memory 130 of FIG. 1).

The first electronic device 211 may autonomously connect to the first network (e.g., the second network 199 (the long-range wireless communication network) of FIG. 1) using the SIM 211a (e.g., the SIM 196 of FIG. 1).

In an embodiment, the second electronic device 221 may be configured to be connected, directly or indirectly, to the first electronic device 211 through the service server 311 to use the call function of the first electronic device 211. To this end, the second electronic device 221 may communicate with the service server 311 through the first network or the second network. In an embodiment, the second electronic device 221 may not include or support a SIM, and may connect to the service server 311 through the second network or through the first electronic device 211. In an embodiment, the second electronic device 221 may include its own SIM (e.g., the SIM 196 of FIG. 1), autonomously connect to the first network, using the SIM, and communicate with the service server 311 through the first network.

Without a SIM, the second electronic device 221 may use the communication and message continuity function based on short-range wireless communication (e.g., WiFi or Bluetooth). Even when the first electronic device 211 and the second electronic device 221 are spaced apart from each other by more than the coverage of short-range wireless communication, the second electronic device 221 may be connected to the service server 311 via a short-range wireless communication node (e.g., a wireless access point) to use the call and message continuity function of the first electronic device 211.

In an embodiment, the first electronic device 211 and the second electronic device 221 may be connected, directly or indirectly, to the same second network (e.g., the first network 198 (the short-range wireless communication network) of FIG. 1). The second electronic device 221 may be connected to the first electronic device 211 through the second network. In an embodiment, the second electronic device 221 may be connected to a second network different from that of the first electronic device 211. The second electronic device 221 may communicate with the service server 311 through the second network.

In an embodiment, the service server 311 (e.g., the processor 313) may receive a connection request for an incoming call corresponding to a phone number stored in the SIM 211a of the first electronic device 211 from the first electronic device 211 or from a service server connected, directly or indirectly, to a call peer (e.g., an external electronic device) through the communication circuit 315. The service server 311 (e.g., the processor 313, comprising processing circuitry) may identify the second electronic device 221 registered to provide the call and message continuity function for the first electronic device 211, in response to the connection request. The service server 311 (e.g., the processor 313) may transfer the connection request for the incoming call to the first electronic device 211 and/or the second electronic device 221, and accordingly, one or both of the first electronic device 211 and/or the second electronic device 221 may ring or vibrate for the incoming call. In an embodiment, one or both of the first electronic device 211 and/or the second electronic device 221 may display information (e.g., a caller number) corresponding to the incoming call on the display module 213 and/or the display module 223.

In an embodiment, upon receipt of an incoming call response corresponding to the incoming call from the second electronic device 221 earlier than an incoming call response corresponding to the incoming call from the first electronic device 211, the service server 311 may connect the incoming call to the second electronic device 221. In an embodiment, voice, video or media corresponding to the incoming call may be transferred from the first electronic device 211 to the second electronic device 221 through the service server 311, or (e.g., when the first electronic device 211 and the second electronic device 221 belong to the same network), from the first electronic device 211 to the second electronic device 221. In an embodiment, voice, video or media corresponding to the incoming call may be transferred from the second electronic device 221 to the first electronic device 211 through the service server 311 or from the second electronic device 221 to the first electronic device 211.

The first electronic device 211 may transfer the voice, video, or media to the call peer (e.g., the external electronic device) corresponding to the incoming call. In an embodiment, voice, video, or media generated from the first electronic device 211 or the second electronic device 221 may be transferred from the service server 311 to the call peer (e.g., the external electronic device) corresponding to the incoming call.

In an embodiment, the second electronic device 221 may use the call function (e.g., call origination) of the first electronic device 211 through the service server 311. An outgoing call request from the second electronic device 221 may be transferred to the first electronic device 211 through the service server 311, and the first electronic device 211 may transfer the outgoing call request to the call peer (recipient). Upon receipt of an outgoing call response corresponding to the outgoing call request from the call peer, the first electronic device 211 may transfer the outgoing call response to the second electronic device 221 through the service server 311 or directly. Media (voice and/or video) generated in a call corresponding to the outgoing call request may be transferred from the first electronic device 211 to the second electronic device 221, or from the first electronic device 211 to the second electronic device 221 through the service server 311.

Figure 4:
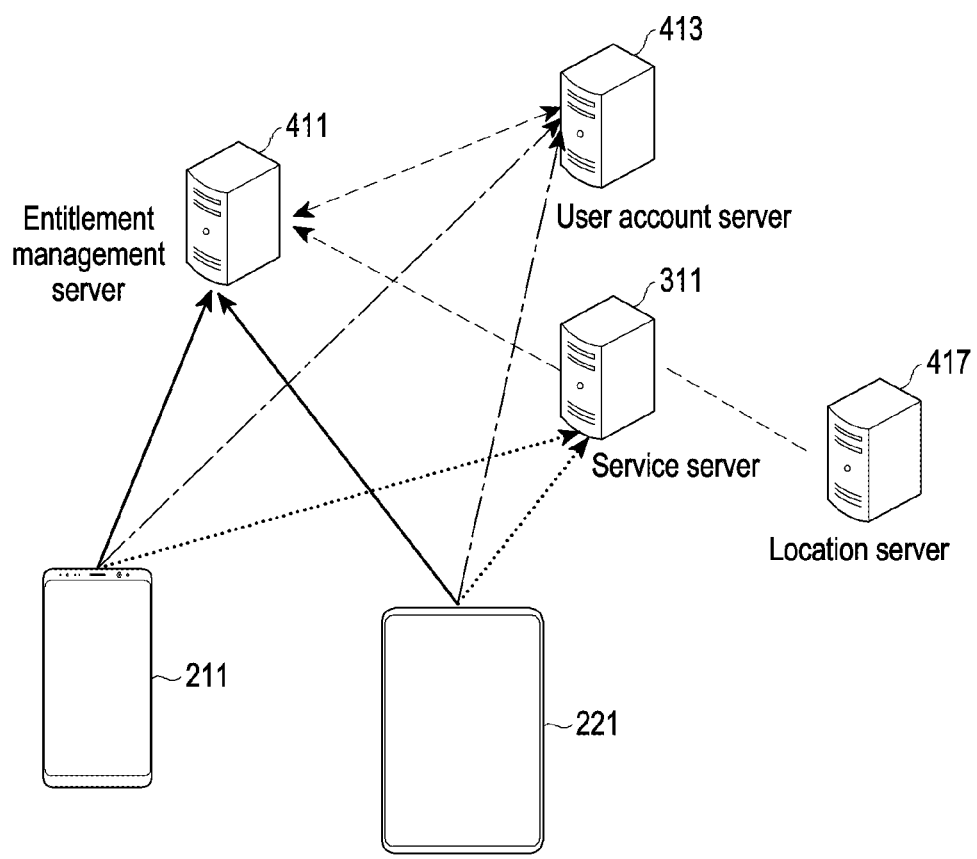
FIG. 4 is a block diagram illustrating a system for providing a call and message continuity function according to an example embodiment.

FIG. 4 is a block diagram illustrating a system for providing the call and message continuity function according to an embodiment.

Referring to FIG. 4, an entitlement management server 411 may store and manage information (e.g., user information, account information, a phone number, device information, and/or group information) about each user's communication group, and provide information about the communication group to the service server 311, upon request. The service server 311 may access the entitlement management server 411 and identify information about the communication group of the first electronic device 211 or the second electronic device 221, and set the communication group (e.g., perform group creation, group addition, group deletion, group update, device addition, or device deletion).

In an embodiment, a user account server 413 may store and manage information about a user account (e.g., a user ID or an account name), and process user authentication. In an embodiment, the user authentication may be performed in conjunction with the entitlement management server 411. According to an embodiment, upon log-in on a user account, the user account server 413 may generate temporary authentication information. The entitlement management server 411 may request user authentication from the user account server 413, using a user ID and temporary authentication information received from the first electronic device 211 or the second electronic device 221 through the service server 311. The user account server 413 may process the user authentication request from the entitlement management server 411 and provide a response (accept or reject) to the user authentication request.

In an embodiment, the service server 311 may include one or more servers to provide the call and message continuity function. In an embodiment, the service server 311 may include a call session control function (CSCF) server, and/or a telephony application server (TAS). In an embodiment, the service server 311 may include an IMS server to support media calls. In an embodiment, the service server 311 may include a message relay server supporting a message relay function. In an embodiment, the message relay server may provide a message synchronization function.

For example, the CSCF server may operate as at least one of a proxy call session control function (P-CSCF), an interrogating call session control function (I-CSCF), or a serving call session control function (S-CSCF) server, which forms an IMS network. The P-CSCF server may operate as a contact point with the electronic device 211 or 221 in the IMS network, and may proxy session initiation protocol (SIP) messages. The P-CSCF server may provide functions such as security and/or compression in conjunction with the electronic device 211 or 221. The I-CSCF server may be responsible for routing SIP messages to another network node (e.g., another CSCF or the electronic device 211 or 221) in the IMS network to provide the call and message continuity function.

In an embodiment, the S-CSCF server may manage a session state for SIP messages. The S-CSCF server may perform call control required to provide a subscriber-requested service through routing to the TAS. The S-CSCF server may serve as an SIP register to process a device registration request from the electronic device 211 or 221, and manage a device registration state.

In an embodiment, the TAS may provide an IMS-based multimedia communication service. The TAS may provide the call and message continuity function according to certain example embodiments by supporting an IMS-based media call.

In an embodiment, the service server 311 may identify communication group information from the entitlement management server 411. In an embodiment, when the first electronic device 211 or the second electronic device 221 requests device registration from the service server 311, for the call and message continuity function, the service server 311 may identify whether the device 211 or 221 which has transmitted the request or the communication group is registered in the entitlement management server 411, and then perform authentication for the device 211 or 221 through the user account server 413. In an embodiment, when the first electronic device 211 or the second electronic device 221 transmits a request (e.g., hyper-text transfer protocol (HTTP) request) for a synchronization service to the service server 311, the service server 311 may identify whether the device 211 or 221 which has transmitted the request or the communication group is registered in the entitlement management server 411, and then perform authentication for the device 211 or 221 through the user account server 413.

In an embodiment, the service server 311 may communicate with a location server 417 that tracks and manages the location of the first electronic device 211 and/or the second electronic device 221. The location server 417 may collect and store the location of the first electronic device 211 and/or the second electronic device 221. In an embodiment, the location may include a cell ID, access point information, and/or a global positioning system (GPS) location (a latitude and a longitude).

In an embodiment, the entitlement management server 411 may obtain and identify device configuration information on a communication group basis. The entitlement management server 411 may identify information (e.g., the address(es) of server(s) required to provide a communication relay function) related to a service subscribed to by the user from the service server 311.

In an embodiment, the first electronic device 211 or the second electronic device 221 may identify device configuration information from the service server 311 related to the call and message continuity function, and use the call and message continuity function (e.g., call forking or call log synchronization) in conjunction with the service server 311 based on the device configuration information.

In an embodiment, the first electronic device 211 or the second electronic device 221 may identify communication group information about the user from the entitlement management server 411, and use the call and message continuity function (e.g., call forking or call log synchronization) in conjunction with the service server 311 based on the communication group information.

Figure 5:
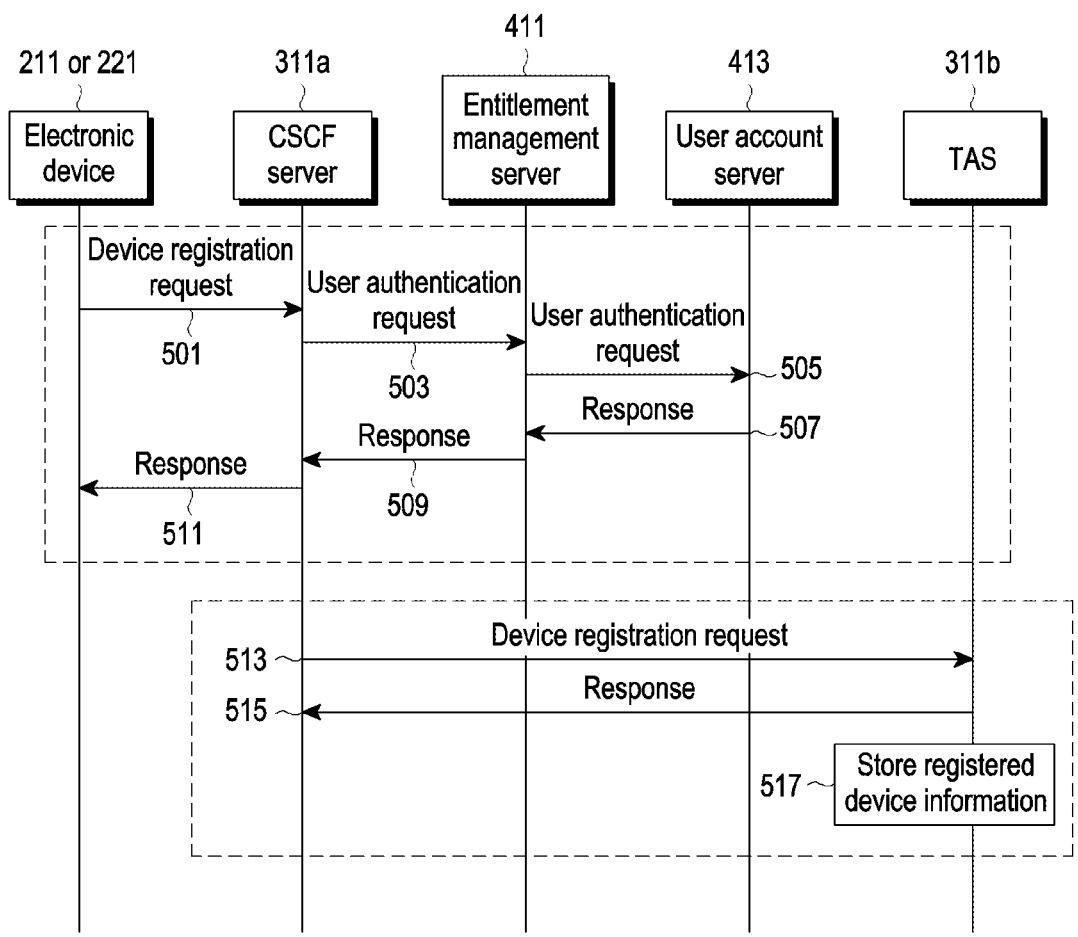
FIG. 5 is a diagram illustrating a signal flow for a device registration procedure for the call and message continuity function according to an example embodiment.

FIG. 5 is a diagram illustrating a signal flow for a device registration procedure for the call and message continuity function according to an embodiment. According to embodiments, at least one of the following operations may be skipped, changed, or reordered.

Referring to FIG. 5, operations 501 to 511 may be a user authentication procedure.

In operation 501, the electronic device 211 or 221 may transmit a device registration request to the service server 311 (e.g., a CSCF server 311a). The device registration request may include at least one of a user ID, a group ID, a device ID, or temporary authentication information.

In operation 503, the CSCF server 311a may transmit a user authentication request to the entitlement management server 411 to identify whether the device registration request is for an authorized user. The user authentication request may include at least one of the user ID, the group ID, the device ID, or the temporary authentication information obtained from the device registration request.

In operation 505, the entitlement management server 411 may transmit a user authentication request to the user account server 413. The user authentication request may include at least one of the user ID or the temporary authentication information.

In operation 507, the user account server 413 may transmit a response based on an authentication result (success or failure) to the entitlement management server 411.

In operations 509 and 511, the response based on the authentication result may be transferred to the CSCF server 311a and the electronic device 211 or 221.

Operations 513 to 517 may be a device registration procedure.

In operation 513, the CSCF server 311a may transmit a device registration request to the service server 311 (e.g., a TAS 311b). In operation 515, the TAS 311b may perform device registration according to the device registration request, and transmit a response (registration success or registration failure) to the CSCF server 311a. In an embodiment, the TAS 311b may refer to the result of the user authentication in operation 509, for the device registration.

In operation 517, the TAS 311b may register and store device information (e.g., a model name, a model number, a serial number, an International Mobile Equipment Identity (IMEI), and/or a medium control access (MAC) address) about the electronic device 211 or 221, corresponding to the device registration request.

Figure 6:
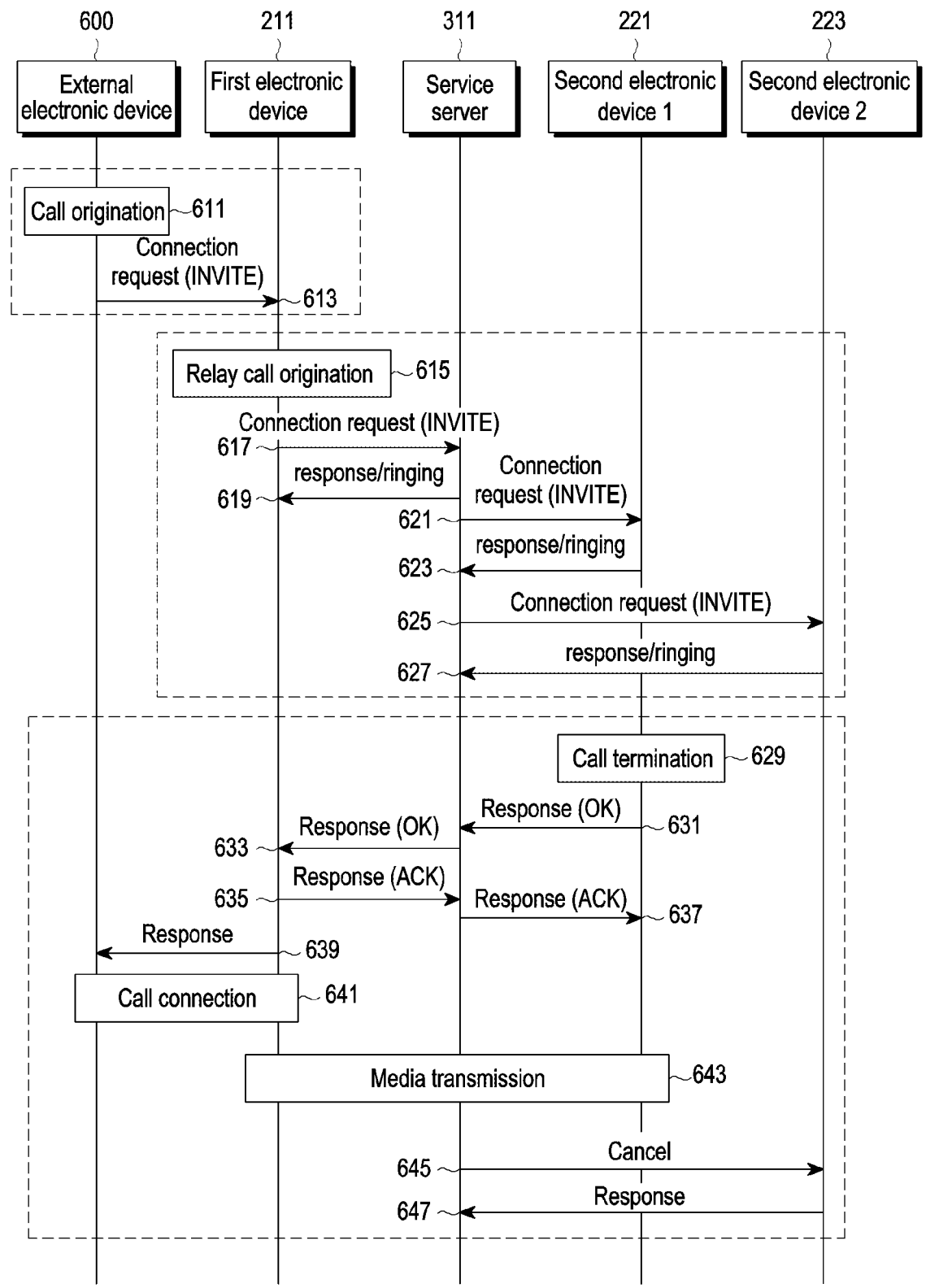
FIG. 6 is a diagram illustrating a signal flow for call termination based on the call and message continuity function according to an example embodiment.

FIG. 6 is a diagram illustrating a signal flow for call termination based on the call and message continuity function according to an embodiment. In the illustrated case, a call originating from a peer electronic device 600 is received by second electronic device 1 221, by way of example.

Referring to FIG. 6, operations 611 and 613 may be a call origination procedure.

In operation 611, the peer electronic device 600 (e.g., a caller) may originate a call by designating a called phone number according to a user input. The call may be, for example, a voice over long term evolution (VoLTE) call. The called phone number may be, for example, a phone number of the first electronic device 211.

In operation 613, a service server (not shown) of the peer electronic device 600 may transmit a connection request (e.g., an SIP INVITE message) for the call made by the peer electronic device 600 to the first electronic device 211 corresponding to the called phone number. The connection request may include the called phone number.

Operations 615 to 627 may be a call termination request procedure.

In operation 615, the first electronic device 211 may originate a relay call corresponding to the call. In an embodiment, the first electronic device 211 may identify that the call and message continuity function is activated by a user setting, and determine to originate the relay call. In an embodiment, the first electronic device 211 may identify at least one secondary device (e.g., second electronic device 1 221 and second electronic device 2 223) registered for the call and message continuity function.

In operation 617, the first electronic device 211 may transmit a connection request (e.g., a SIP INVITE message) for the relay call to the service server 311 (e.g., the CSCF server/TAS). In an embodiment, the connection request for the relay call may include a device ID of the first electronic device 211 as caller information, and a group ID of the communication group to which the first electronic device 211 belongs as callee information.

In operation 619, the service server 311 may transmit a response corresponding to the connection request, and ringing to the first electronic device 211. In an embodiment, the service server 311 may identify that at least one electronic device (e.g., second electronic device 1 221 and second electronic device 2 223) is included in the communication group set for the first electronic device 211. In an embodiment, the service server 311 may obtain information about the communication group set for the first electronic device 211 by querying the entitlement management server 411 in response to the connection request. In an embodiment, the service server 311 may pre-store the information about the communication group set for the first electronic device 211 according to the registration of the first electronic device 211 and read the information in response to the connection request.

In operation 621, the service server 311 may transmit a connection request (e.g., a SIP INVITE message) for the relay call to second electronic device 1 221 in the communication group set in correspondence with the called phone number. In operation 623, second electronic device 1 221 may transmit a response to the connection request and ringing to the service server 311.

In operation 625, the service server 311 may transmit a connection request (e.g., a SIP INVITE message) for the relay call to second electronic device 2 223 in the communication group. In operation 627, second electronic device 2 223 may transmit a response to the connection request, and ringing.

Operations 629 to 647 may be a call termination and connection procedure.

Second electronic device 1 221 may terminate the call according to a user (callee) input in operation 629, and transmit a response (e.g., a SIP OK message) indicating that the call has been terminated to the service server 311 in operation 631. In operation 633, the response may be transferred to the first electronic device 211. In operation 635, the first electronic device 211 may transmit an acknowledgment (ACK) indicating that the response has been received to the service server 311. In operation 637, the service server 311 may transfer the ACK to second electronic device 1 221.

In operation 639, the first electronic device 211 may transmit a response (e.g., a SIP OK message) to the peer electronic device 600 that has originated the call. In operation 641, a call connection may be established between the peer electronic device 600 and the first electronic device 211.

In operation 643, a call session may be created between the first electronic device 211 and second electronic device 1 221 via the service server 311, and a call connection may be established between the external (e.g., peer) electronic device 600 and second electronic device 1 221 through the call session. Media transmission may be performed among the first electronic device 211, the service server 311, and second electronic device 1 221 during the call connection.

When a call and message continuity service is used, a routing path may be established, for example, in the order of the external (e.g., peer) electronic device 600→the first electronic device 211→the service server 311 (e.g., the IMS server or the CSCF server/TAS)→the second electronic device or in the reverse order.

When receiving the response from second electronic device 1 221 in operation 631 and transmitting the ACK in operation 637, the service server 311 may transmit a cancellation request to second electronic device 2 223 to request to stop the connection request of operation 625 in operation 645 (e.g., see cancel at operation 645). Second electronic device 2 223 may stop ringing and transmit a response to the cancellation request to the service server 311 in operation 647 (e.g., see Response at operation 647 in FIG. 6).

Figure 7:
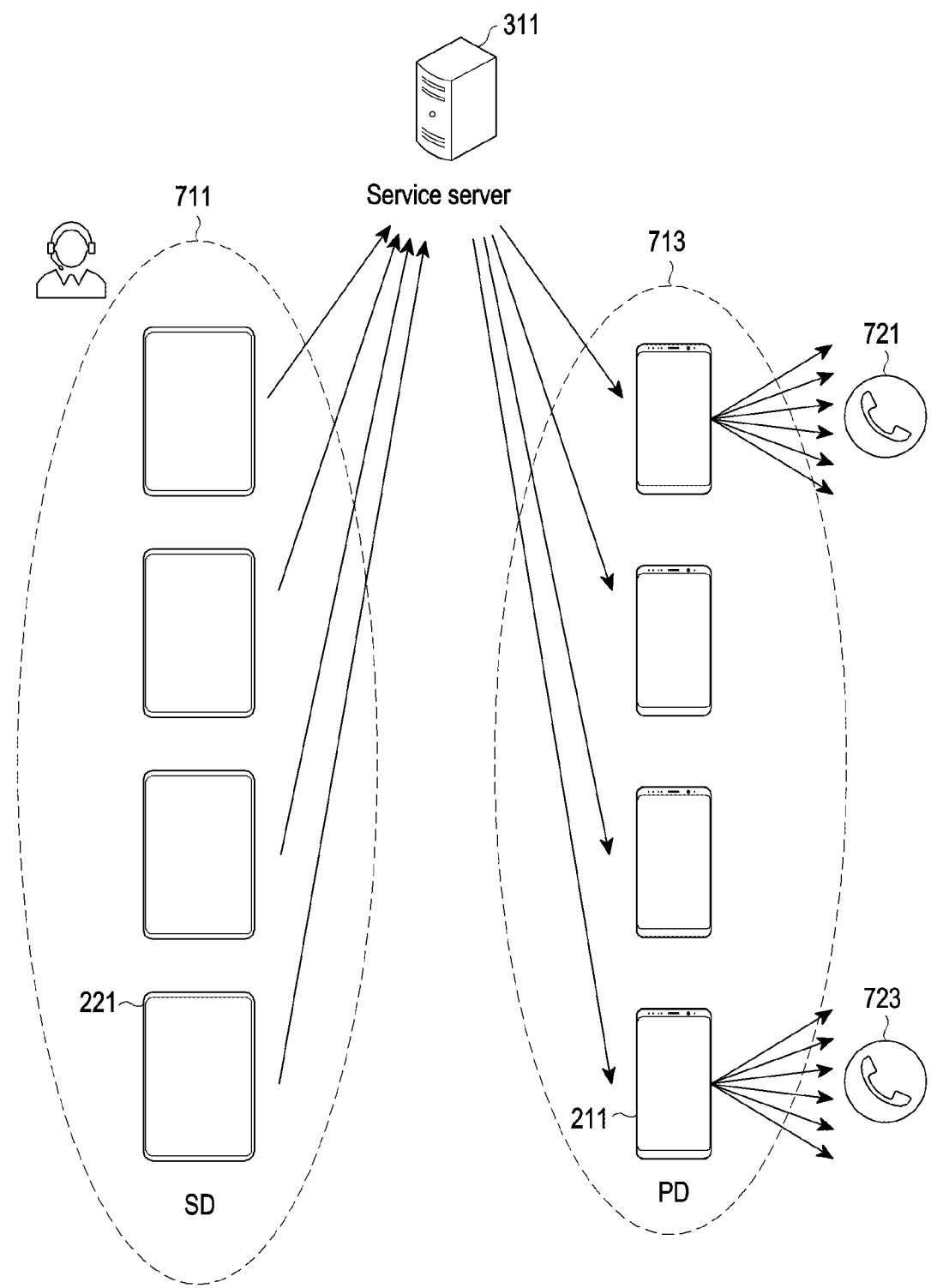
FIG. 7 is a diagram illustrating a network environment according to an example embodiment.

FIG. 7 is a diagram illustrating a network environment according to an embodiment.

Referring to FIG. 7, the service server 311 may be configured to support the call and message continuity function between a plurality of first electronic devices (e.g., including the first electronic device 211 (a primary device (PD)) and a plurality of second electronic devices (e.g., including the second electronic device 221 (a secondary device (SD)). The first electronic device 211 may be associated with the second electronic device 221 based on the same user account. The second electronic device 221 may not include a SIM, and may originate or terminate a call or transmit or receive a message (e.g. an SMS or MMS message) through the service server 311, using the call function of the first electronic device 211.

The call and message continuity function enables the second electronic device 221, which is not capable of using a call or a message alone, to use the communication function (e.g., a call function or a message function) of the first electronic device 211 connected to the same user account through the service server 311. The call and message continuity function may be abused for malicious purposes such as spam calls, spam messages, or voice phishing. In many actual cases, a malicious user may place a plurality of second electronic devices (e.g., including the second electronic device 221) in the same space 711 (e.g., a room or a building), place a plurality of corresponding first electronic devices (e.g., including the first electronic device 211) in another space 713, and transmit a very large number of calls or messages to users (e.g., peer electronic devices 721 and 723) that do not want to receive, through the plurality of second electronic devices (e.g., including the second electronic device 221) using the call function of the first electronic devices (e.g., including the first electronic device 211).

For example, the plurality of second electronic devices (e.g., the second electronic device 221) may be located in another country and transmit multiple calls or messages to domestic peers (e.g., external electronic devices) through the plurality of first electronic devices (e.g., the first electronic device 211) located in Korea.

When the second electronic device 221 makes a call, using the call function of the first electronic device 211, the service server 311 according to an embodiment may determine whether a condition that multiple calls are originated to multiple call peers is satisfied by the second electronic device 221. When the condition is satisfied, the service server 311 may determine whether there are other external electronic devices around the second electronic device 221, which originate multiple calls to multiple call peers. When the above conditions are satisfied, the service server 311 may determine that the second electronic device 221 and the nearby external electronic devices are spam callers.

Figure 8:
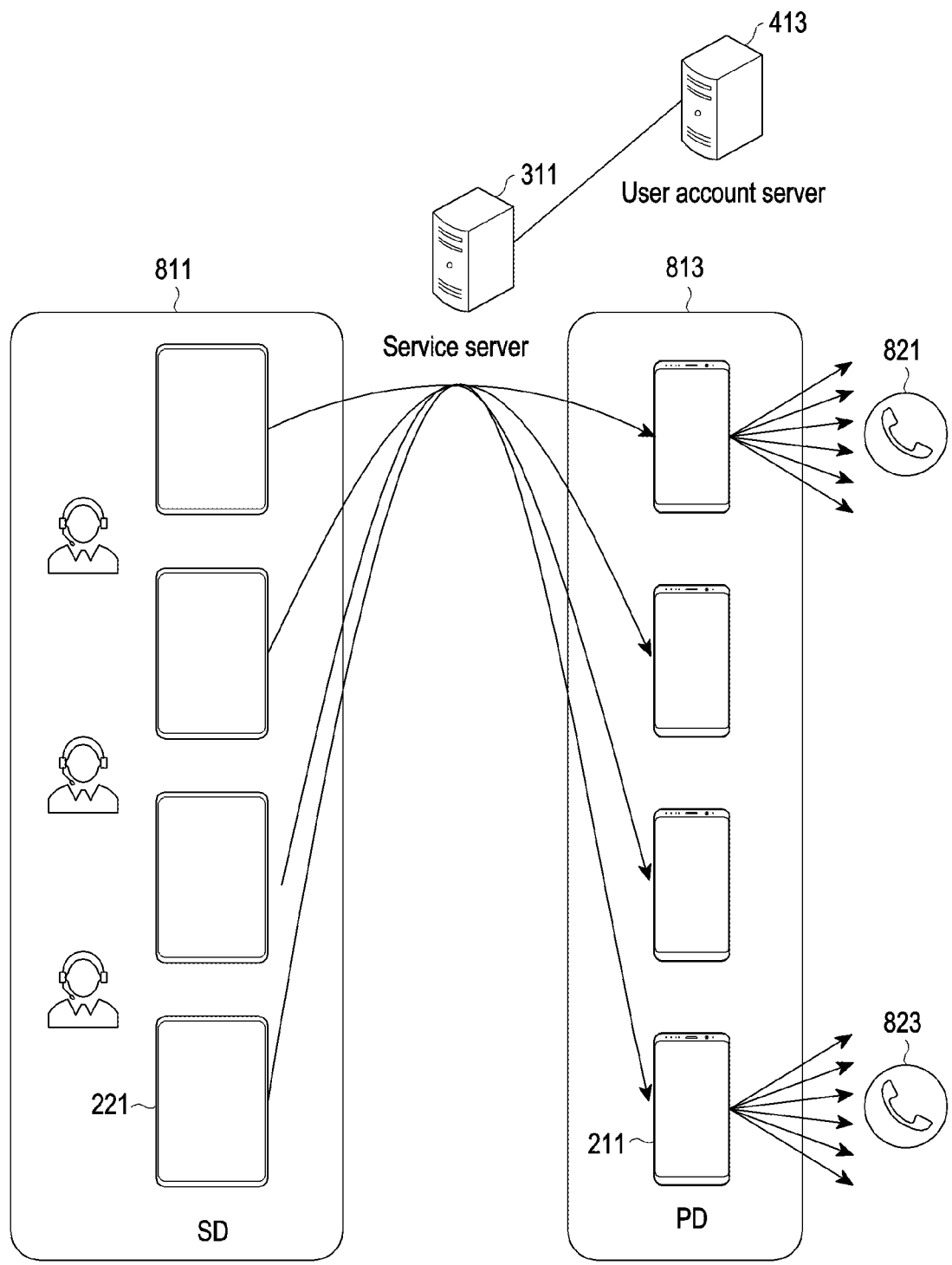
FIG. 8 is a diagram illustrating a procedure of detecting a spam call according to an example embodiment.

FIG. 8 is a diagram illustrating a procedure of detecting a spam call according to an embodiment.

Referring to FIG. 8, in an embodiment, the service server 311 may connect a call originated by the second electronic device 221 located in a space 811 (e.g., a room or a building) to the first electronic device 211 located in the same or different space 813. The first electronic device 211 may originate the call through a long-range wireless communication network (e.g., the second network 199). The second electronic device 221 may not include a SIM, and may originate the call using the call function of the first electronic device 211 through the service server 311. The service server 311 may determine that the second electronic device 221 is capable of originating the call using the call function of the first electronic device 211, based on user account information and user authentication information about the first electronic device 211 and the second electronic device 221 received from the user account server 413.

In an embodiment, the service server 311 may collect call log information about calls which are originated by the second electronic device 221 and connected to call peers (e.g., peer electronic devices 821 and 823) through the first electronic device 211. In an embodiment, the call log information may include at least one of a unique call number, a call type (incoming call, outgoing call, or missed call), a call time, account information (an account ID and/or an account name), secondary device information, primary device information, or call peer information (e.g. a phone number and/or device information). The user account information may include the user account shared by the first electronic device 211 and the second electronic device 221, and may be identified through the user account server 413.

The secondary device information may be included in the call log information, when a call is originated or terminated by the second electronic device 221 as a secondary device. According to an embodiment, the secondary device information may include device information (e.g., at least one of a model name, a model number, a serial number, or a MAC address) about the second electronic device 221. For a call connected, directly or indirectly, between the first electronic device 211 and a call peer without involving the secondary device, the call log information may not include the secondary device information. In an embodiment, when the secondary device information is not included or is set to an invalid value (e.g., '0' or empty) for a call included in the call log information, the service server 311 may determine that the secondary device is not involved in the call (e.g., has not originated or terminated the call). In an embodiment, when the secondary device information is included in the call log information for the call, the service server 311 may determine that the call has been originated or terminated by the secondary device.

In an embodiment, the service server 311 may count the number of calls originated by at least one secondary device (e.g., the second electronic device 221) related to the first electronic device 211 by analyzing call log information about the first electronic device 211, and determine whether the counted number of calls is greater than a specified threshold. When the number of calls is greater than the threshold, the service server 311 may detect external electronic devices located around the second electronic device 221.

In an embodiment, the service server 311 may collect and analyze call log information about the detected external electronic devices, and determine whether the number of calls originated by each of the external electronic devices is greater than the specified threshold. In an embodiment, the service server 311 may request and receive user account information about the detected external electronic devices from the user account server 413, and obtain call log information about the detected external electronic devices based on the user account information. Upon detection of at least one external electronic device having more outgoing calls than the threshold, the service server 311 may determine the detected at least one external electronic device and the second electronic device 221 as spam callers.

Figure 9:
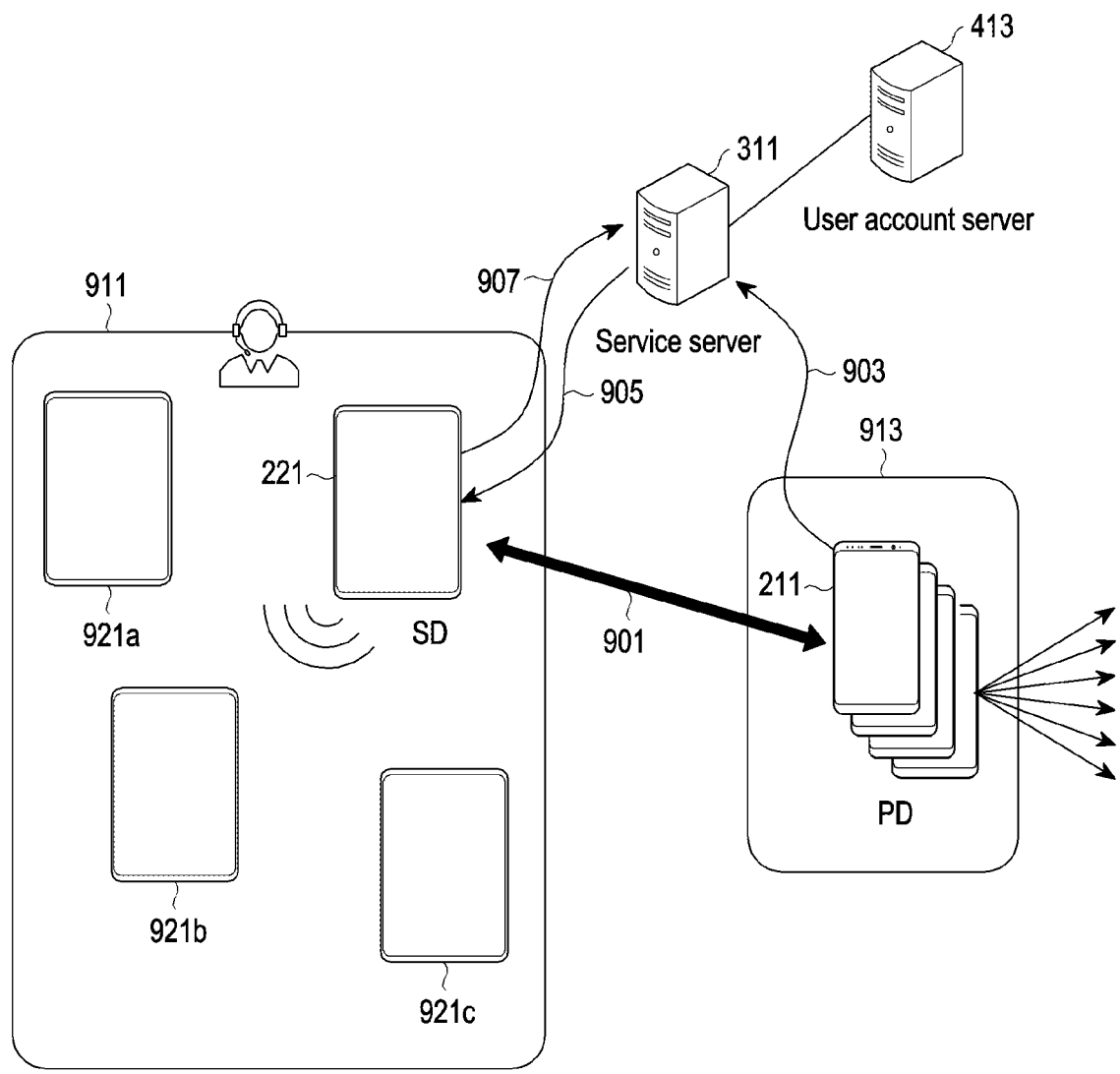
FIG. 9 is a diagram illustrating an operation of searching for nearby devices according to an example embodiment.

FIG. 9 is a diagram illustrating an operation of searching for nearby devices according to an embodiment.

Referring to FIG. 9, the service server 311 may connect, directly or indirectly, a call originated by the second electronic device 221 located in a space 911 (e.g., a room or a building) to the first electronic device 211 located in the same or different space 913. The first electronic device 211 may originate the call through a long-range wireless communication network (e.g., the second network 199), and the second electronic device 221 may use the call function of the first electronic device 211 through the service server 311. The service server 311 may determine that the second electronic device 221 is capable of originating the call using the call function of the first electronic device 211, based on user account information and user authentication information about the first electronic device 211 and the second electronic device 221 received from the user account server 413.

In an embodiment, upon completion of an outgoing call from the second electronic device 221 using the call function of the first electronic device 211 (operation 901), the service server 311 may collect call log information including information about the outgoing call (operation 903). In an embodiment, the service server 311 may identify whether a first condition for determining whether the second electronic device 221 is a spam caller is satisfied by analyzing the call log information. In an embodiment, when the number of calls including outgoing calls from the first electronic device 211 or outgoing calls from the second electronic device 221 is greater than a specified threshold, the service server 311 may determine that the first condition is satisfied. In an embodiment, when the number of calls including outgoing calls from the second electronic device 221 except for outgoing calls from the first electronic device 211 is greater than the threshold, the service server 311 may determine that the first condition is satisfied. When the first condition is satisfied, the service server 311 may search for nearby devices (e.g., external electronic devices 921a, 921b, and 921c) located around the second electronic device 221.

In an embodiment, the service server 311 may search for and discover the external electronic devices 921a, 921b, and 921c using a nearby scan function of the second electronic device 221. In an embodiment, the service server 311 may transmit a scan request for requesting a nearby device search to the second electronic device 221 (operation 905), and receive nearby device information from the second electronic device 221 in response to the scan request (operation 907). The second electronic device 221 may discover the external electronic devices 921a, 921b, and 921c located in the vicinity, using a short-range communication technology (e.g., Bluetooth or WiFi) in response to the scan request, generate nearby device information about the external electronic devices 921a, 921b, and 921c, and transmit the nearby device information to the service server 311. The nearby device information may include, for example, MAC addresses (e.g., Bluetooth MAC addresses or WiFi MAC addresses) of the external electronic devices 921a, 921b, and 921c.

In an embodiment, the service server 311 may obtain user account information about the external electronic devices 921a, 921b, and 921c from the user account server 413, using the nearby device information as a key, and obtain call log information about the external electronic devices 921a, 921b, and 921c corresponding to the user account information from another server or read the call log information from internal memory (e.g., the memory 317).

According to an embodiment, the service server 311 may determine whether there is at least one external electronic device satisfying the afore-described first condition among the external electronic devices 921a, 921b, and 921c by analyzing the call log information about the external electronic devices 921a, 921b, and 921c. In an embodiment, when the number of calls originated by the external electronic device 921a is greater than the threshold, the service server 311 may determine that the external electronic device 921a satisfies the first condition. In an embodiment, when the external electronic device 921a is a secondary device, and the number of calls originated by the external electronic device 921a through a primary device (not shown) is greater than the threshold, the service server 311 may determine that the external electronic device 921a satisfies the first condition. In an embodiment, when the external electronic device 921a is a secondary device, and the total number of calls originated by the external electronic device 921a through the primary device (not shown) and calls originated by the primary device is greater than the threshold, the service server 311 may determine that the external electronic device 921a satisfies the first condition.

For example, the service server 311 may detect that the external electronic device 921a and the external electronic device 921b among the external electronic devices 921a, 921b, and 921c satisfy the first condition as a result of the determination. According to an embodiment, the service server 311 may determine that the second electronic device 221, the external electronic device 921a, and the external electronic device 921b are spam callers. In an embodiment, the service server 311 may store information indicating that the second electronic device 221, the external electronic device 921a, and the external electronic device 921b are spam callers in the internal memory (e.g., the memory 317). In an embodiment, the service server 311 may notify the user account server 413 and/or another server (e.g., the entitlement management server 411, the user authentication server, or a communication operator server) of the information indicating that the second electronic device 221, the external electronic device 921a, and the external electronic device 921b are spam callers. In response to the notification from the service server 311, a communication operator may perform a specified operation such as blocking the communication accounts of the second electronic device 221, the external electronic device 921a, the external electronic device 921b, and related primary devices (e.g., the first electronic device 211) or transmitting a warning message. In an embodiment, the service server 311 may notify a public institution such as the police of information about the spam callers.

In an embodiment, when the outgoing calls of the second electronic device 221 satisfy the first condition, the service server 311 may search for nearby devices around the first electronic device 211 and nearby devices around the second electronic device 221, and determine whether the first condition is satisfied for the nearby devices discovered as a result of the search. In an embodiment, the service server 311 may determine nearby devices satisfying the first condition as spam callers.

Figure 10:
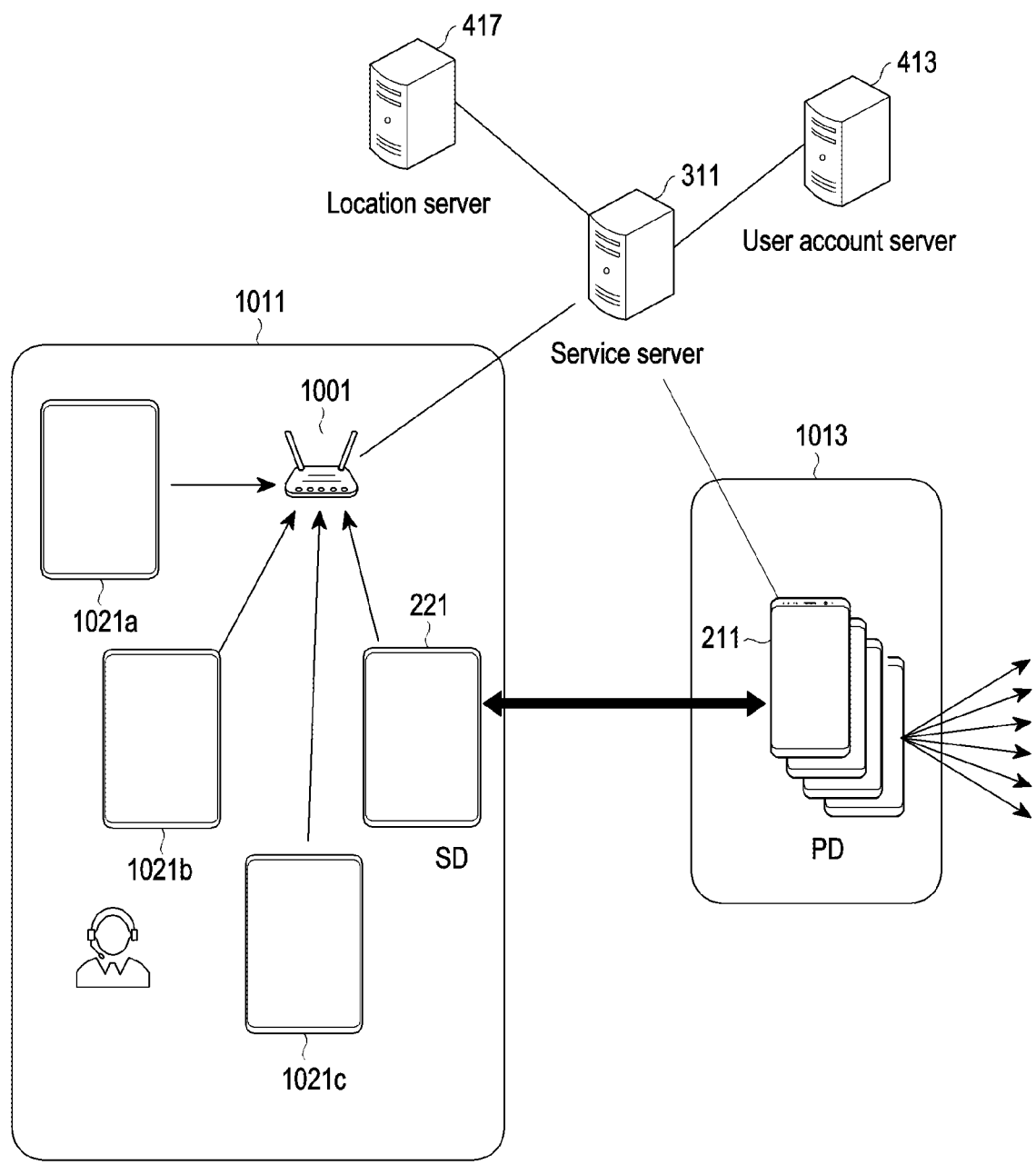
FIG. 10 is a diagram illustrating an operation of searching for nearby devices, using location information according to an example embodiment.

FIG. 10 is a diagram illustrating an operation of searching for nearby devices, using location information according to an embodiment.

Referring to FIG. 10, the service server 311 may connect a call originated by the second electronic device 221 located in a space 1011 (e.g., a room or a building) to the first electronic device 211 located in the same or different space 1013. The first electronic device 211 may originate the call through a long-range wireless communication network (e.g., the second network 199), and the second electronic device 221 may use the call function of the first electronic device 211 through the service server 311. The service server 311 may determine that the second electronic device 221 is capable of originating the call using the call function of the first electronic device 211, based on user account information and user authentication information about the first electronic device 211 and the second electronic device 221 received from the user account server 413.

In an embodiment, upon completion of an outgoing call from the second electronic device 221 using the call function of the first electronic device 211, the service server 311 may collect call log information including information about the outgoing call. In an embodiment, the service server 311 may identify that a condition (referred to as a "first condition") that the number of recent outgoing calls is greater than a threshold is satisfied for the first electronic device 211 associated with the second electronic device 221 by analyzing the call log information. In an embodiment, the service server 311 may determine the first condition by comparing the threshold with the number of calls including outgoing calls from the first electronic device 211 or outgoing calls from the second electronic device 221. In an embodiment, the service server 311 may determine the first condition by comparing the threshold with the number of calls including outgoing calls from the second electronic device 221 except for outgoing calls from the first electronic device 211. When the first condition is satisfied, the service server 311 may search for nearby devices (e.g., external electronic devices 1021a, 1021b, and 1021c) located around the second electronic device 221.

In an embodiment, the service server 311 may search for the external electronic devices 1021a, 1021b, and 1021c based on location information about the second electronic device 221. In an embodiment, the location information may include a cell ID, access point information, and/or a GPS location (a latitude and a longitude). In an embodiment, when the second electronic device 221 is connected, directly or indirectly, to the service server 311 using WiFi, the location information may include access point information identifying an access point 1001 accessed by the second electronic device 221.

In an embodiment, the service server 311 may discover electronic devices (e.g., the external electronic devices 1021a, 1021b, and 1021c) connected, directly or indirectly, to the same access point 1001 as the second electronic device 221. In an embodiment, the service server 311 may identify a list of a plurality of electronic devices (e.g., secondary devices) connected through the service server 311, discover the external electronic devices 1021a, 1021b, and 1021c having the same Internet protocol (IP) address as the second electronic device 221 and port numbers different from the second electronic device 221, and obtain device information about the external electronic devices 1021a, 1021b, and 1021c. The device information may include, for example, MAC addresses of the external electronic devices 1021a, 1021b, and 1021c.

In an embodiment, the service server 311 may obtain user account information about the external electronic devices 1021a, 1021b, and 1021c from the user account server 413, using the device information as a key, and obtain call log information about the external electronic devices 1021a, 1021b, and 1021c corresponding to the user account information from another server or read the call log information from the internal memory (e.g., the memory 317).

According to an embodiment, the service server 311 may determine whether there is at least one external electronic device satisfying the afore-described first condition among the external electronic devices 1021a, 1021b, and 1021c by analyzing the call log information about the external electronic devices 1021a, 1021b, and 1021c. In an embodiment, when the number of calls originated by the external electronic device 1021a is greater than the threshold, the service server 311 may determine that the external electronic device 1021a satisfies the first condition. In an embodiment, when the external electronic device 1021a is a secondary device, and the number of calls originated by the external electronic device 1021a through a primary device (not shown) is greater than the threshold, the service server 311 may determine that the external electronic device 1021a satisfies the first condition. In an embodiment, when the external electronic device 1021a is a secondary device, and the total number of calls originated by the external electronic device 1021a through the primary device (not shown) and calls originated by the primary device is greater than the threshold, the service server 311 may determine that the external electronic device 1021a satisfies the first condition.

For example, the service server 311 may detect that the external electronic device 1021a and the external electronic device 1021b among the external electronic devices 1021a, 1021b, and 1021c satisfy the first condition as a result of the determination. According to an embodiment, the service server 311 may determine that the second electronic device 221, the external electronic device 1021a, and the external electronic device 1021b satisfying the first condition are spam callers. In an embodiment, the service server 311 may store information indicating that the second electronic device 221, the external electronic device 1021a, and the external electronic device 1021b are spam callers in the internal memory (e.g., the memory 317). In an embodiment, the service server 311 may notify the user account server 413 and/or another server (e.g., the entitlement management server 411, the user authentication server, or a communication operator server) of the information indicating that the second electronic device 221, the external electronic device 1021a, and the external electronic device 1021b are spam callers. In response to the notification from the service server 311, the communication operator may perform a specified operation such as blocking the communication accounts of the second electronic device 221, the external electronic device 1021a, the external electronic device 1021b, and related primary devices (e.g., the first electronic device 211) or transmitting a warning message.

In an embodiment, when the outgoing calls of the second electronic device 221 satisfy the first condition, the service server 311 may search for nearby devices around the first electronic device 211 and nearby devices around the second electronic device 221, and determine whether the first condition is satisfied for the nearby devices discovered as a result of the search. In an embodiment, the service server 311 may detect nearby devices located around the first electronic device 211, using the cell ID or access point information about a base station accessed by the first electronic device 211. In an embodiment, the service server 311 may determine nearby devices satisfying the first condition as spam callers.

Figure 11:
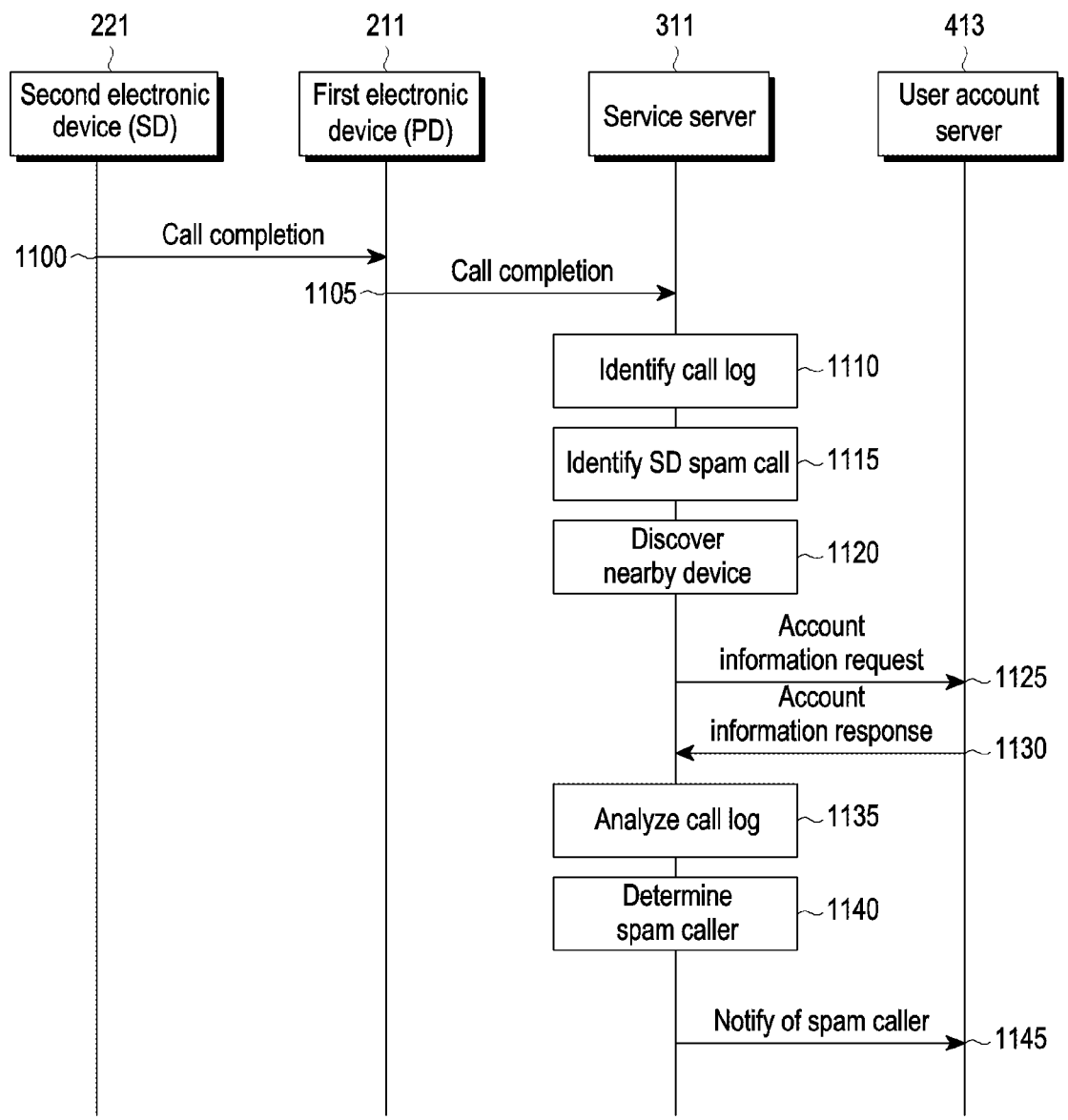
FIG. 11 is a diagram illustrating a signal flow for an operation of detecting spam calls made by nearby devices according to an example embodiment.

FIG. 11 is a diagram illustrating a signal flow for an operation of detecting spam calls made by nearby devices according to an embodiment. In an embodiment, at least one of the following operations may be performed by the processor 313 of the service server 311.

Referring to FIG. 11, the second electronic device 221 (e.g., a secondary device) may be connected, directly or indirectly, to the first electronic device 211 (e.g., a primary device) through the service server 311, and make an outgoing call using the call function of the first electronic device 211. In operation 1100, the second electronic device 221 may notify the first electronic device 211 of completion of the call. According to an embodiment, the second electronic device 221 may notify the first electronic device 211 of the completion of the call by a SIP BYE message. In an embodiment, in operation 1100, the first electronic device 211 may detect that the second electronic device 221 has completed the call (e.g., pressing of a call end button or completion of the call by a call peer). In operation 1105, the first electronic device 211 may notify the service server 311 of the completion of the call. In an embodiment, the first electronic device 211 may generate a SIP BYE message and transmit the SIP BYE message to the service server 311, or may transfer the SIP BYE message received from the second electronic device 221 to the service server 311.

In operation 1110, the service server 311 may obtain and analyze call log information including calls performed by the second electronic device 221 to determine whether the second electronic device 221 is a spam caller. In an embodiment, the service server 311 may read call log information related to the second electronic device 221 from the memory 317 or request and obtain the call log information related to the second electronic device 221 from another server, when an outgoing call of the second electronic device 221 ends, every specified period, or when a specified condition is satisfied (e.g., the number or frequency of calls of the second electronic device 221 is greater than a specified threshold). In an embodiment, the service server 311 may read call log information related to the first electronic device 211 from the memory 317 or request and obtain the call log information related to the first electronic device 211 from another server, every specified period or when a specified condition (e.g., a network state or a request of a communication operator) is satisfied.

In operation 1115, the service server 311 may determine whether a first condition for determining a spam call ("SD spam call") of the secondary device is satisfied by analyzing the call log information. In an embodiment, when the second electronic device 221 is a secondary device, and the number of calls originated by the second electronic device 221 during a predetermined time period (e.g., several days or tens of days) is greater than a specified threshold, the service server 311 may determine that the first condition is satisfied. In an embodiment, when the second electronic device 221 is a secondary device, and the number of calls originated using the call function of the first electronic device 211 by the second electronic device 221 during a predetermined time period (e.g., several days or tens of days) is greater than the threshold, the service server 311 may determine that the first condition is satisfied. In an embodiment, when the second electronic device 221 is a secondary device, and the total number of calls originated using the call function of the first electronic device 211 by the second electronic device 221 and calls originated by the first electronic device 211 during a predetermined time period (e.g., several days or tens of days) is greater than the specified threshold, the service server 311 may determine that the first condition is satisfied.

In operation 1120, the service server 311 may search for nearby devices around the second electronic device 221 determined as satisfying the first condition. In an embodiment, the service server 311 may search for nearby devices (e.g., external electronic devices) located within a specified distance from the second electronic device 221 based on location information (e.g., a cell ID, access point information, or a GPS location) about the second electronic device 221. In an embodiment, the service server 311 may manage the locations of external electronic devices registered in the service server 311 or obtain location information about the external electronic devices from another server (e.g., the location server 417), and determine whether the external electronic devices are located around the second electronic device 221 by comparing the locations of the external electronic devices with the location information about the second electronic device 221.

In an embodiment, the service server 311 may determine that external electronic devices having the same cell ID or the same access point information as the second electronic device 221 are nearby devices of the second electronic device 221. In an embodiment, the service server 311 may determine that external electronic devices located within a specified distance from the location (e.g., GPS location) of the second electronic device 221 are nearby devices of the second electronic device 221.

In an embodiment, the service server 311 may obtain device information (e.g., MAC addresses) about the external electronic devices located around the second electronic device 221 through the search.

In operation 1125, the service server 311 may request account information (e.g., account IDs and/or account names) about one or more devices discovered as a result of the search in operation 1120 from the user account server 413, using device information (e.g., MAC addresses) about the external electronic devices. In operation 1130, the service server 311 may receive the account information from the user account server 413.

In operation 1135, the service server 311 may identify call log information about the one or more external electronic devices based on the account information. In an embodiment, the service server 311 may store and manage call log information about electronic devices registered in the service server 311, and identify the call log information about the one or more external electronic devices based on the account information.

In operation 1140, the service server 311 may detect at least one external electronic device satisfying the first condition among the one or more external electronic devices, and determine the second electronic device 221 and the detected at least one external electronic device as spam callers. In an embodiment, the service server 311 may detect at least one external electronic device having more outgoing calls than a specified threshold during a specified time among the one or more discovered external electronic devices. In an embodiment, the service server 311 may detect at least one external electronic device that is a secondary device and has more outgoing calls than the threshold during a specified time among the one or more discovered external electronic devices.

In operation 1145 that may be optional, the service server 311 may notify the user account server 413 and/or another server (e.g., the entitlement management server 411, the user authentication server, or the communication service provider server) of information about spam callers determined in operation 1140, for example, information about the second electronic device 221, the first electronic device 211, and the detected at least one external electronic device. In an embodiment, the service server 311 may block outgoing calls from the second electronic device 221, the first electronic device 211, and the detected at least one external electronic device, which are determined to be spam callers.

Figure 12:
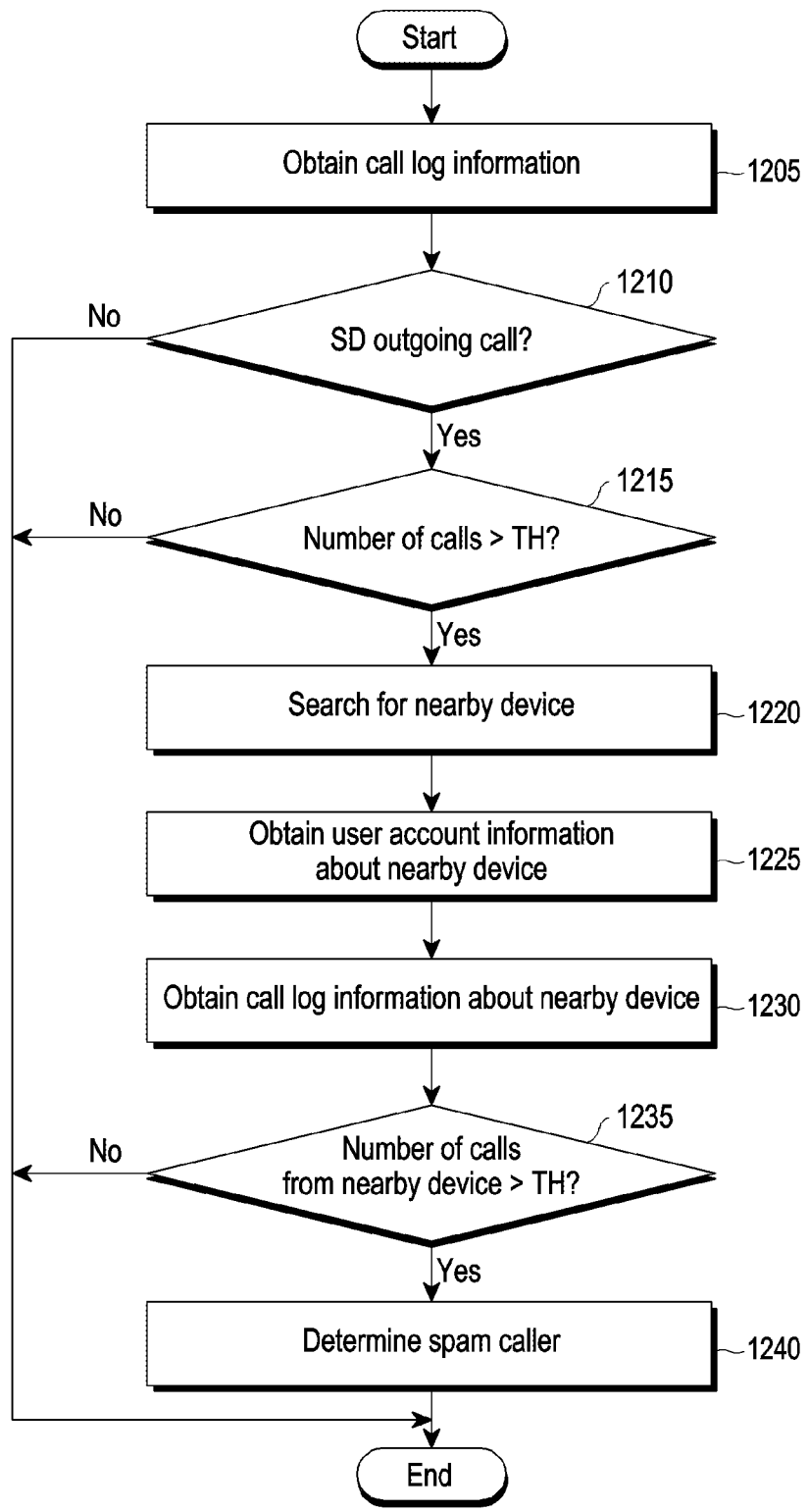
FIG. 12 is a flowchart illustrating an operation of a service server for detecting spam calls made by nearby devices according to an example embodiment.

FIG. 12 is a flowchart illustrating an operation of a service server for detecting spam calls made by nearby devices according to an embodiment. In an embodiment, at least one of the following operations may be performed by the processor 313 of the service server 311.

Referring to FIG. 12, the service server 311 may obtain and analyze first call log information in operation 1205. According to an embodiment, the service server 311 may read first call log information related to the first electronic device 211 or the second electronic device 221 from the memory 317, or request and obtain the first call log information related to the first electronic device 211 or the second electronic device 221 from another server, every specified time period or when a specified condition is satisfied (e.g., the number or frequency of calls made by the second electronic device 221 is greater than a specified threshold). In an embodiment, the service server 311 may obtain first call log information about the first electronic device 211 as a primary device related to the second electronic device 221 to determine whether the second electronic device 221 is a spam caller. The first call log information may include an outgoing call from the second electronic device 221.

At least one of operation 1210 or operation 1215 may be an operation of determining whether the second electronic device 221 satisfies a first condition.

In operation 1210, the service server 311 may determine whether the first call log information includes an outgoing call from the second electronic device 221 as a secondary device. In an embodiment, the service server 311 may recognize that the second electronic device 221 is a secondary device based on device information about the second electronic device 221. In an embodiment, the service server 311 may identify the second electronic device 221 registered as a secondary device for the first electronic device 211. In an embodiment, the service server 311 may determine that the second electronic device 221 is a secondary device based on secondary device information included in the first call log information. When the first call log information includes an outgoing call from the second electronic device 221 ('Yes' in operation 1210), the procedure may proceed to operation 1215. Otherwise ('No' in operation 1210), the procedure may end. In an embodiment, operation 1210 may be skipped, and the service server 311 may proceed from operation 1205 to operation 1215.

In operation 1215, the service server 311 may count the number of outgoing calls from the second electronic device 221 (e.g., the number of outgoing calls during a predetermined time period) based on the first call log information, and determine whether the number of outgoing calls is greater than a specified threshold TH. In an embodiment, the service server 311 may compare the threshold with the total number of outgoing calls from the second electronic device 221 and outgoing calls directly from the first electronic device 211 as the primary device for the second electronic device 221. In an embodiment, the service server 311 may compare the threshold with the total number of outgoing calls directly from the first electronic device 211 as the primary device for the second electronic device 221 and outgoing calls from at least one secondary device (e.g., the second electronic device 221) related to the first electronic device 211. When the number of outgoing calls is greater than the threshold ('Yes' in operation 1215), the service server 311 may proceed to operation 1220. Otherwise ('No' in operation 1215), the procedure may end. Operations 1210 and 1215 may correspond to the afore-described operation of determining whether the first condition is satisfied.

In operation 1220, the service server 311 may search for nearby devices of the second electronic device 221. In an embodiment, the service server 311 may search for nearby devices (e.g., external electronic devices) located within a specified distance from the second electronic device 221 based on location information (e.g., a cell ID, access point information, or a GPS location) about the second electronic device 221. In an embodiment, the service server 311 may determine external electronic devices having the same cell ID or the same access point information as the second electronic device 221 as nearby devices of the second electronic device 221. In an embodiment, the service server 311 may determine external electronic devices located within a specified distance from the location (e.g., GPS location) of the second electronic device 221 as nearby devices of the second electronic device 221. In an embodiment, the service server 311 may discover one or more external electronic devices located within a specified distance from at least one of the first electronic device 211 or at least one secondary device (e.g., including the second electronic device 221) related to the first electronic device.

In operation 1225, the service server 311 may obtain account information (e.g., account IDs and/or account names) about one or more external electronic devices discovered as a result of the search in operation 1220 from the user account server 413, using device information (e.g., MAC addresses) about the one or more external electronic devices. In operation 1230, the service server 311 may obtain second call log information about the one or more external electronic devices based on the account information. In an embodiment, the service server 311 may store and manage call log information about electronic devices registered in the service server 311, and identify the second call log information about the one or more external electronic devices based on the account information. According to an embodiment, the service server 311 may skip operation 1225, and obtain the second call log information about the one or more external electronic devices, using the device information (e.g., MAC address) about the one or more discovered external electronic devices.

Operation 1235 may be an operation of determining whether each of the one or more external electronic devices satisfies the first condition.

In operation 1235, the service server 311 may determine whether the number of outgoing calls from each of the one or more external electronic devices is greater than the specified threshold TH based on the second call log information about the one or more external electronic devices. In an embodiment, the service server 311 may compare the threshold with the total number of outgoing calls from each external electronic device and a corresponding primary device. Upon detection of at least one external electronic device having more outgoing calls than the threshold, the service server 311 may proceed to operation 1240. Otherwise, the procedure may end. Operation 1235 may correspond to an operation of determining whether the afore-described first condition is satisfied for each discovered external electronic device.

In operation 1240, the service server 311 may determine the second electronic device 221 and the at least one external electronic device detected in operation 1235 as spam callers. In an embodiment, the service server 311 may notify another server (e.g., the user account server 413, the entitlement management server 411, the user authentication server, or the communication operator server) of information about the second electronic device 221 and the detected at least one external electronic device. In an embodiment, the service server 311 may block calls made by the second electronic device 221 and the detected at least one external electronic device, and/or related primary devices.

In an embodiment, the service server 311 may determine whether the second electronic device 221 and at least one external electronic device located around it are spam message senders, using message log information (e.g., first message log information related to the second electronic device 221 and second message log information related the nearby device) similar to the above-described call log information.

Figure 13:
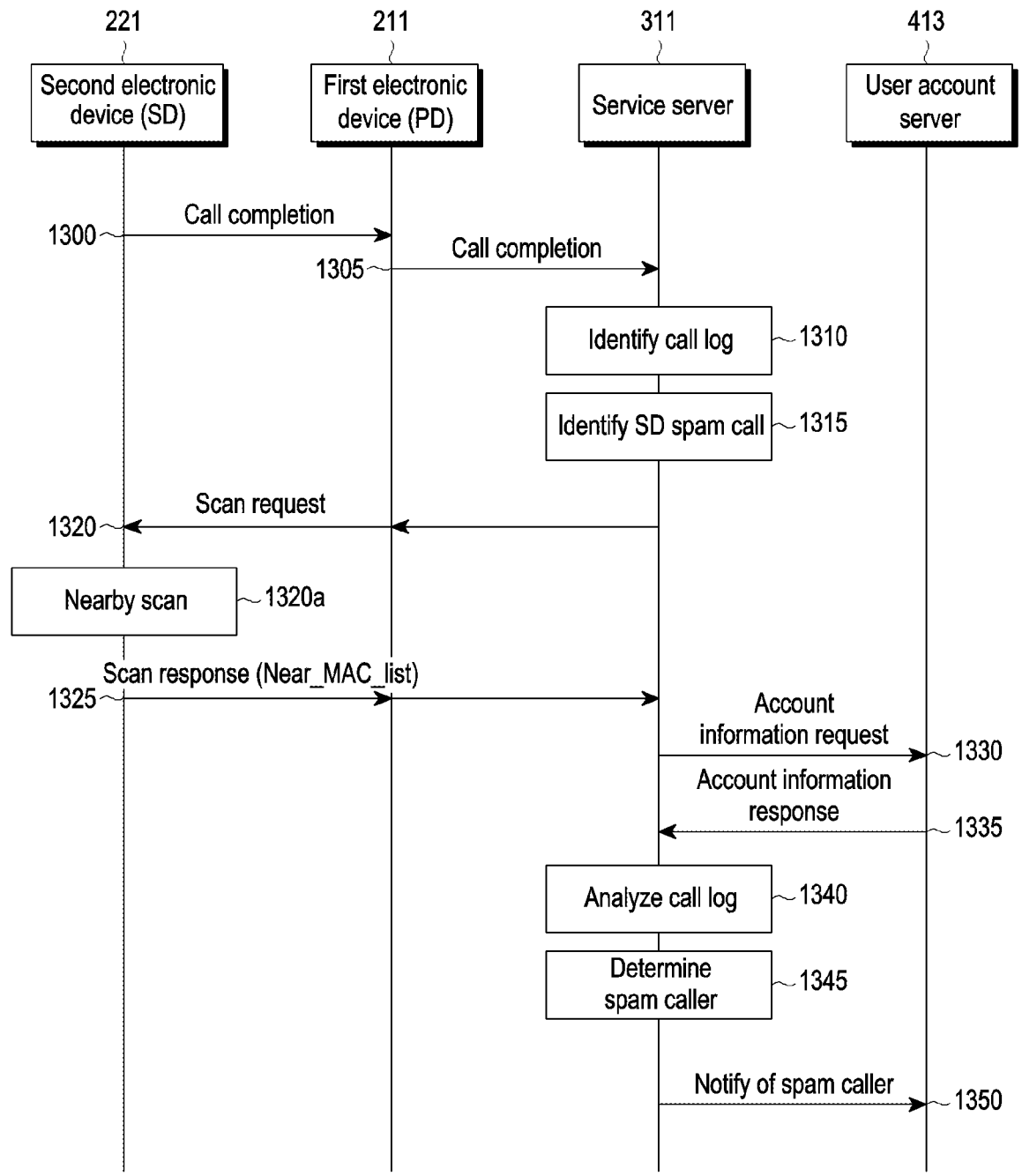
FIG. 13 is a diagram illustrating a signal flow for an operation of detecting a spam call, using nearby scan according to an example embodiment.

FIG. 13 is a diagram illustrating a signal flow for an operation of detecting spam calls, using nearby scan according to an embodiment. In an embodiment, at least one of the following operations may be performed by the processor 313 of the service server 311.

Referring to FIG. 13, the second electronic device 221 (e.g., a secondary device) may be connected, directly or indirectly, to the first electronic device 211 (e.g., a primary device) through the service server 311, and make an outgoing call using the call function of the first electronic device 211. In operation 1300, the second electronic device 221 may notify the first electronic device 211 of completion of the call. In an embodiment, the second electronic device 221 may notify the first electronic device 211 of the completion of the call by a SIP BYE message. In an embodiment, in operation 1300, the first electronic device 211 may detect that the second electronic device 221 has completed the call (e.g., pressing of a call end button or completion of the call by a call peer). In operation 1305, the first electronic device 211 may notify the service server 311 of the completion of the call. In an embodiment, the first electronic device 211 may generate a SIP BYE message and transmit the SIP BYE message to the service server 311, or may transfer the SIP BYE message received from the second electronic device 221 to the service server 311.

In operation 1310, the service server 311 may obtain and analyze call log information including calls performed by the second electronic device 221 to determine whether the second electronic device 221 is a spam caller. In an embodiment, the service server 311 may read first call log information related to the second electronic device 221 from the memory 317 or request and obtain the first call log information related to the second electronic device 221 from another server, when an outgoing call of the second electronic device 221 ends, every specified period, or when a specified condition is satisfied (e.g., the number or frequency of calls of the second electronic device 221 is greater than a specified threshold). In an embodiment, the service server 311 may read first call log information related to the first electronic device 211 from the memory 317 or request and obtain the first call log information related to the first electronic device 211 from another server, every specified period or when a specified condition (e.g., a network state or a request of a communication operator) is satisfied.

In operation 1315, the service server 311 may determine whether a first condition for determining a spam call ("SD spam call") of the secondary device is satisfied by analyzing the first call log information. In an embodiment, when the second electronic device 221 is a secondary device, and the number of calls originated by the second electronic device 221 during a predetermined time period (e.g., several days or tens of days) is greater than a specified threshold, the service server 311 may determine that the first condition is satisfied. In an embodiment, when the second electronic device 221 is a secondary device, and the number of calls originated using the call function of the first electronic device 211 by the second electronic device 221 during a predetermined time period (e.g., several days or tens of days) is greater than the specified threshold, the service server 311 may determine that the first condition is satisfied. In an embodiment, when the second electronic device 221 is a secondary device, and the total number of calls originated using the call function of the first electronic device 211 by the second electronic device 221 and calls originated by the first electronic device 211 during a predetermined time period (e.g., several days or tens of days) is greater than the specified threshold, the service server 311 may determine that the first condition is satisfied.

In operation 1320, the service server 311 may transmit a scan request for searching for nearby devices around the second electronic device 221 determined as satisfying the first condition. In an embodiment, the scan request may be transferred from the service server 311 to the second electronic device 221 through the first electronic device 211 or without passing through the first electronic device 211. In operation 1320a, the second electronic device 221 may execute a nearby scan function in response to the scan request. In an embodiment, the second electronic device 221 may search for electronic devices located around the second electronic device 221 and discover one or more external electronic devices, by using a short-range communication technology (e.g., Bluetooth or WiFi). In operation 1325, the second electronic device 221 may transmit a scan response including nearby device information indicating the one or more external electronic devices discovered through the nearby scan. In an embodiment, the nearby device information may include a list (e.g., Near_MAC_list) of Bluetooth MAC addresses or WiFi MAC addresses of the one or more discovered external electronic devices.

In operation 1330, the service server 311 may request account information (e.g., account IDs and/or account names) about the one or more discovered devices from the user account server 413, using the nearby device information (e.g., MAC addresses) obtained from the scan response. In operation 1335, the service server 311 may receive the account information from the user account server 413.

In operation 1340, the service server 311 may identify second call log information about the one or more discovered external electronic devices based on the account information. In an embodiment, the service server 311 may store and manage call log information about electronic devices registered in the service server 311, and identify the second call log information about the one or more discovered external electronic devices based on the account information.

In operation 1345, the service server 311 may detect at least one external electronic device satisfying the first condition among the one or more discovered external electronic devices, and determine the second electronic device 221 and the at least one detected external electronic device as spam callers. In an embodiment, the service server 311 may detect at least one external electronic device having more outgoing calls than a specified threshold during a specified time among the one or more discovered external electronic devices. In an embodiment, the service server 311 may detect at least one external electronic device that is a secondary device and has more outgoing calls than the threshold during a specified time among the one or more discovered external electronic devices.

In operation 1350 that may be optional, the service server 311 may notify the user account server 413 and/or another server (e.g., the entitlement management server 411, the user authentication server, or the communication service provider server) of information about the spam callers determined in operation 1345, for example, information about the second electronic device 221, the first electronic device 211, and the at least one detected external electronic device. In an embodiment, the service server 311 may block outgoing calls from the second electronic device 221, the first electronic device 211, and the at least one detected external electronic device, which are determined as spam callers.

Figure 14:
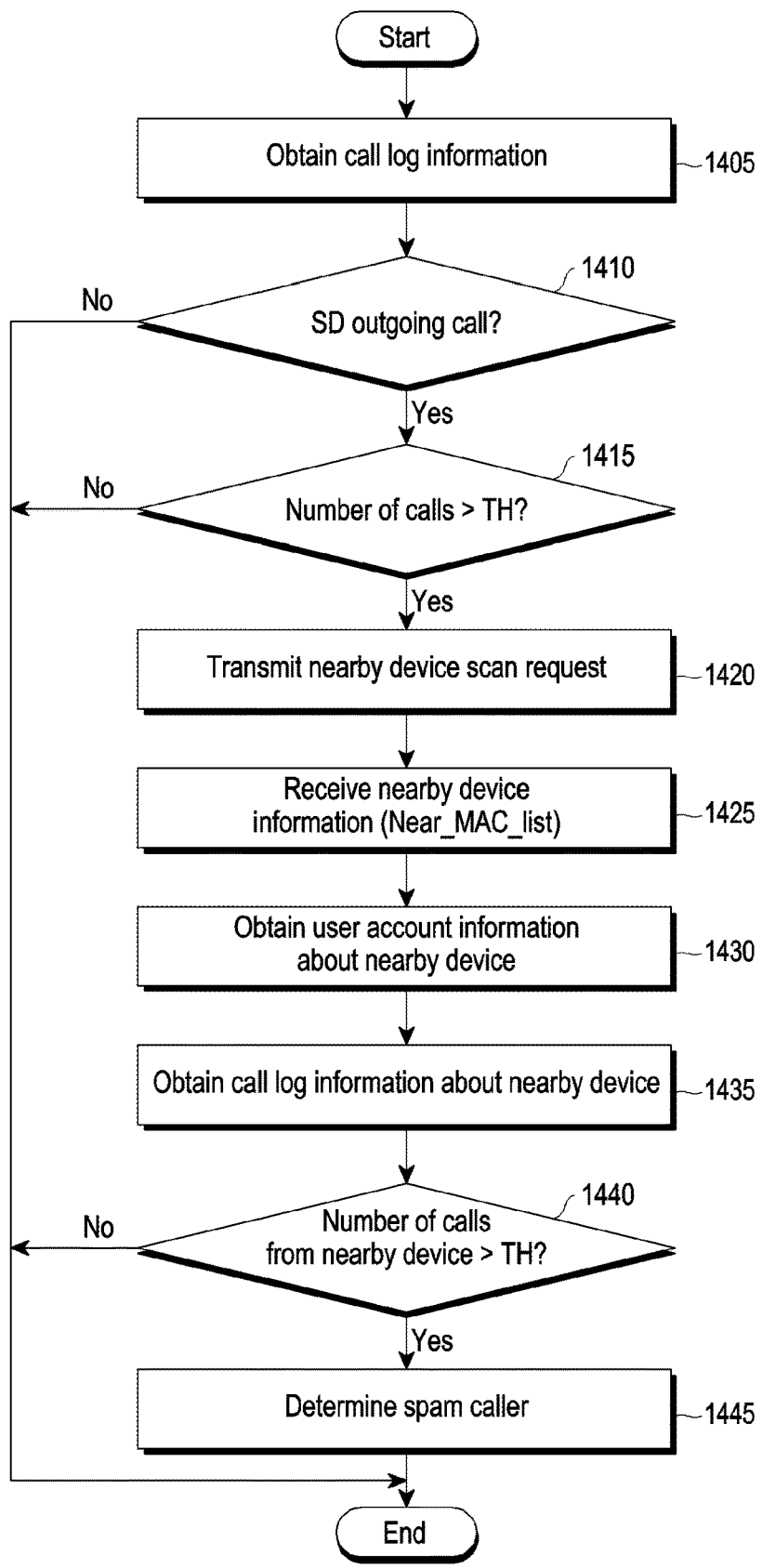
FIG. 14 is a flowchart illustrating an operation of a service server for detecting a spam call using nearby scan of an electronic device according to an example embodiment.

FIG. 14 is a flowchart illustrating an operation of a service server for detecting spam calls by nearby scan of an electronic device according to an embodiment. In an embodiment, at least one of the following operations may be performed by the processor 313 of the service server 311.

Referring to FIG. 14, the service server 311 may obtain and analyze first call log information in operation 1405. In an embodiment, the service server 311 may read first call log information related to the first electronic device 211 or the second electronic device 221 from the memory 317, or request and obtain the first call log information related to the first electronic device 211 or the second electronic device 221 from another server, every specified time period or when a specified condition is satisfied (e.g., the number or frequency of calls made by the second electronic device 221 is greater than a specified threshold). In an embodiment, the service server 311 may obtain first call log information about the first electronic device 211 as a primary device related to the second electronic device 221 to determine whether the second electronic device 221 is a spam caller. The first call log information may include an outgoing call from the second electronic device 221.

At least one of operation 1410 or operation 1415 may be an operation of determining whether the second electronic device 221 satisfies a first condition.

In operation 1410, the service server 311 may determine whether the first call log information includes an outgoing call from the second electronic device 221 as a secondary device. In an embodiment, the service server 311 may recognize that the second electronic device 221 is a secondary device based on device information about the second electronic device 221. In an embodiment, the service server 311 may identify the second electronic device 221 registered as a secondary device for the first electronic device 211. In an embodiment, the service server 311 may determine that the second electronic device 221 is a secondary device based on secondary device information included in the first call log information. When the first call log information includes an outgoing call from the second electronic device 221, the procedure may proceed to operation 1415. Otherwise, the procedure may end. In an embodiment, operation 1410 may be skipped, and the service server 311 may proceed from operation 1405 to operation 1415.

In operation 1415, the service server 311 may count the number of outgoing calls from the second electronic device 221 (e.g., the number of outgoing calls during a predetermined time period) based on the first call log information, and determine whether the number of outgoing calls is greater than a specified threshold TH. In an embodiment, the service server 311 may compare the threshold with the total number of outgoing calls from the second electronic device 221 and outgoing calls directly from the first electronic device 211 as the primary device for the second electronic device 221. In an embodiment, the service server 311 may compare the threshold with the total number of outgoing calls directly from the first electronic device 211 as the primary device for the second electronic device 221 and outgoing calls from at least one secondary device (e.g., the second electronic device 221) related to the first electronic device 211. When the number of outgoing calls is greater than the threshold ('Yes' in operation 1415), the service server 311 may proceed to operation 1420. Otherwise ('No' in operation 1415), the procedure may end. Operations 1410 and 1415 may correspond to the afore-described operation of determining whether the first condition is satisfied.

In operation 1420, the service server 311 may transmit a scan request for requesting to search for nearby devices to the second electronic device 221. In operation 1425, the service server 311 may receive nearby device information indicating one or more external electronic devices discovered by nearby scan from the second electronic device 221. In an embodiment, the nearby device information may include one or more MAC addresses. In an embodiment, the service server 311 may transmit a scan request to the first electronic device 211 and at least one secondary device (e.g., including the second electronic device 221) related to the first electronic device 211, and receive nearby device information indicating one or more external electronic devices in response to the scan request. In an embodiment, the nearby device information may include at least one external electronic device discovered by the first electronic device 211 and at least one external electronic device discovered by the second electronic device 221.

In operation 1430, the service server 311 may obtain account information (e.g., account IDs and/or account names) about the one or more discovered external electronic devices from the user account server 413, using MAC addresses of the one or more external electronic devices included in the nearby device information. In operation 1435, the service server 311 may obtain second call log information about the one or more external electronic devices based on the account information. In an embodiment, the service server 311 may store and manage call log information about electronic devices registered in the service server 311, and identify the second call log information about the one or more external electronic devices based on the account information. In an embodiment, the service server 311 may skip operation 1430, and obtain the second call log information about the one or more external electronic devices, using the device information (e.g., MAC address) about the one or more discovered external electronic devices.

Operation 1440 may be an operation of determining whether each of the one or more external electronic devices satisfies the first condition.

In operation 1440, the service server 311 may determine whether the number of outgoing calls from each external electronic device is greater than a specified threshold TH based on the second call log information about the one or more external electronic devices. In an embodiment, the service server 311 may compare the threshold with the total number of outgoing calls from each external electronic device and a corresponding primary device. Upon detection of at least one external electronic device having more outgoing calls than the threshold, the service server 311 may proceed to operation 1445. Otherwise, the procedure may end. Operation 1440 may correspond to an operation of determining whether the afore-described first condition is satisfied for each discovered external electronic device.

In operation 1445, the service server 311 may determine the second electronic device 221 and the at least one external electronic device detected in operation 1440 as spam callers. In an embodiment, the service server 311 may notify another server (e.g., the user account server 413, the entitlement management server 411, the user authentication server, or the communication operator server) of information about the second electronic device 221 and the at least one detected external electronic device. In an embodiment, the service server 311 may block calls made by the second electronic device 221 and the at least one detected external electronic device, and/or related primary devices.

In certain example embodiments, the service server 311 may determine whether the second electronic device 221 and at least one external electronic device located around it are spam message senders, using message log information (e.g., first message log information related to the second electronic device 221 and second message log information about the nearby device) similar to the above-described call log information.

In certain example embodiments, the service server 311 may detect a spam caller who makes multiple calls, using call log information.

In certain example embodiments, the service server 311 may simultaneously detect a plurality of spam callers including nearby devices.

According to an embodiment, the service server 311 may include the communication circuit 315 and the at least one processor 313 (comprising processing circuitry). The at least one processor may be connected, directly or indirectly, to a first electronic device and a second electronic device, using the communication circuit. The at least one processor may be configured to obtain first call log information including at least one outgoing call made using a call function of the first electronic device by the second electronic device. The at least one processor may be configured to determine whether the second electronic device satisfies a first condition for determining that the second electronic device is a spam caller, based on the first call log information. The at least one processor may be configured to search for one or more external electronic devices located around the second electronic device, based on the first condition being satisfied. The at least one processor may be configured to obtain second call log information about the one or more external electronic devices. The at least one processor may be configured to determine at least one of the one or more external electronic devices or the second electronic device as a spam caller, based on the second call log information.

In an embodiment, if the second electronic device is a secondary device using the call function of the first electronic device through the server, and the number of outgoing calls made using the call function of the first electronic device by the second electronic device and/or the number of outgoing calls made by the first electronic device is greater than a given threshold, the at least one processor may be configured to determine that the first condition is satisfied for the second electronic device.

In an embodiment, the at least one processor may be configured to determine whether at least one of the one or more external electronic devices satisfies the first condition, based on the second call log information, and determine at least one external electronic device and the second electronic device that satisfy the first condition as spam callers.

In an embodiment, if a first external electronic device among the one or more external electronic devices is a secondary device using a call function of a corresponding primary device through the server, and the number of outgoing calls made using the call function of the corresponding primary device by the first external electronic device and/or the number of outgoing calls made by the corresponding primary device is greater than a given threshold, the at least one processor may be configured to determine that the first external electronic device satisfies the first condition.

In an embodiment, the at least one processor may be configured to transmit a scan request for requesting to search for a nearby device to the second electronic device, based on the first condition being satisfied, and receive nearby device information indicating the one or more external electronic devices from the second electronic device in response to the scan request.

In an embodiment, the nearby device information may include MAC addresses of the one or more external electronic devices.

In an embodiment, the at least one processor may be configured to discover the one or more external electronic devices based on location information about the second electronic device, and the location information may include at least one of a cell ID, an address of an access point accessed by the second electronic device, or a GPS location.

In an embodiment, the at least one processor may be configured to identify an access point accessed by the second electronic device, and discover the one or more external electronic devices accessing the server through the identified access point.

In an embodiment, the at least one processor may be configured to discover the one or more external electronic devices having the same IP address as the second electronic device and different port numbers from the second electronic device.

In an embodiment, the at least one processor may be configured to request account information about the one or more external electronic devices from a user account server, receive the account information about the one or more external electronic devices from the user account server, and obtain the second call log information based on the account information.

According to an embodiment, an operation method of the server 311 may include obtaining (1205 or 1405) first call log information including at least one outgoing call made using a call function of a first electronic device by a second electronic device connected, directly or indirectly, to the server. The method may include determining (1210 and 1215 or 1410 and 1415) whether the second electronic device satisfies a first condition for determining that the second electronic device is a spam caller, based on the first call log information. The method may include searching (1220, or 1420 and 1425) for one or more external electronic devices located around the second electronic device, based on the first condition being satisfied. The method may include obtaining (1230 or 1435) second call log information about the one or more external electronic devices. The method may include determining (1235 and 1240 or 1440 and 1445) at least one of the one or more external electronic devices or the second electronic device as a spam caller, based on the second call log information.

In an embodiment, determining whether the second electronic device satisfies the first condition may include determining that the first condition is satisfied for the second electronic device, in response to the second electronic device being a secondary device using the call function of the first electronic device through the server, and the number of outgoing calls made using the call function of the first electronic device by the second electronic device and/or the number of outgoing calls made by the first electronic device being greater than a given threshold.

In an embodiment, determining the at least one of the one or more external electronic devices or the second electronic device as a spam caller may include determining whether at least one of the one or more external electronic devices satisfies the first condition, based on the second call log information, and determining at least one external electronic device and the second electronic device that satisfy the first condition as spam callers.

In an embodiment, determining whether the at least one of the one or more external electronic devices satisfies the first condition may include, in response to a first external electronic device among the one or more external electronic devices being a secondary device using a call function of a corresponding primary device through the server, and the number of outgoing calls made using the call function of the corresponding primary device by the first external electronic device and/or the number of outgoing calls made by the corresponding primary device being greater than a given threshold, determining that the first external electronic device satisfies the first condition.

In an embodiment, searching for the one or more external electronic devices located around the second electronic device may include transmitting a scan request for requesting to search for a nearby device to the second electronic device, based on the first condition being satisfied, and receiving nearby device information indicating the one or more external electronic devices from the second electronic device in response to the scan request. "Based on" as used herein covers based at least on.

In an embodiment, the nearby device information may include MAC addresses of the one or more external electronic devices.

In an embodiment, searching for the one or more external electronic devices located around the second electronic device may include discovering the one or more external electronic devices based on location information about the second electronic device, and the location information includes at least one of a cell ID, an address of an access point accessed by the second electronic device, or a GPS location.

In an embodiment, searching for the one or more external electronic devices located around the second electronic device may include identifying an access point accessed by the second electronic device, and discovering the one or more external electronic devices accessing the server through the identified access point.

Each embodiment herein may be used in combination with any other embodiment(s) described herein.

In an embodiment, searching for the one or more external electronic devices located around the second electronic device may include discovering the one or more external electronic devices having the same IP address as the second electronic device and different port numbers from the second electronic device.

In an embodiment, obtaining the second call log information about the one or more external electronic devices may include requesting account information about the one or more external electronic devices from a user account server, receiving the account information about the one or more external electronic devices from the user account server, and obtaining the second call log information based on the account information.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various certain example embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via at least a third element.

As used in connection with various certain example embodiments, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various certain example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. A server comprising:
   memory storing instructions;
   communication circuitry; and
   at least one processor,
   wherein the instructions, when executed by the at least one processor individually or collectively, cause the server to:
   connect to a first electronic device and a second electronic device, through the communication circuitry,
   obtain first call log information including at least one outgoing call made using a call function of the first electronic device by the second electronic device,
   determine whether the second electronic device satisfies a first condition for determining that the second electronic device is a spam caller, based on the first call log information,
   based on the first condition being satisfied, transmit, to the second electronic device, a scan request for requesting a nearby device scanning, through the communication circuitry,
   receive, from the second electronic device, nearby device information about one or more external electronic devices located around the second electronic device, through the communication circuitry, after transmitting the scan request, wherein the nearby device information includes one or more media access control (MAC) addresses of the one or more external electronic devices,
   obtain second call log information about the one or more external electronic devices, and
   determine at least one of the one or more external electronic devices and/or the second electronic device as a spam caller, based on the second call log information.

2. The server of claim 1, wherein the instructions, when executed by the at least one processor individually or collectively, cause the server to determine that the first condition is satisfied for the second electronic device based on the second electronic device being a secondary device using the call function of the first electronic device through the server, and a number of outgoing calls made using the call function of the first electronic device by the second electronic device and/or a number of outgoing calls made by the first electronic device being greater than a given threshold.

3. The server of claim 1, wherein the instructions, when executed by the at least one processor individually or collectively, cause the server to:
   determine whether at least one of the one or more external electronic devices satisfies the first condition, based on the second call log information, and
   determine at least one external electronic device and the second electronic device that satisfy the first condition as spam callers.

4. The server of claim 3, wherein the instructions, when executed by the at least one processor individually or collectively, cause the server to determine that a first external electronic device satisfies the first condition based on the first external electronic device among the one or more external electronic devices being a secondary device using a call function of a corresponding primary device through the server, and a number of outgoing calls made using the call function of the corresponding primary device by the first external electronic device and/or a number of outgoing calls made by the corresponding primary device being greater than a given threshold.

5. The server of claim 1, wherein the instructions, when executed by the at least one processor individually or collectively, cause the server to discover the one or more external electronic devices based on location information about the second electronic device,
   wherein the location information includes at least one of: a cell identifier (ID), an address of an access point accessed by the second electronic device, or a global positioning system (GPS) location.

6. The server of claim 1, wherein the instructions, when executed by the at least one processor indicually or collectively, cause the server to:
   identify an access point accessed by the second electronic device, and
   discover the one or more external electronic devices accessing the server through the identified access point.

7. The server of claim 1, wherein the instructions, when executed by the at least one processor indicually or collectively, cause the server to discover the one or more external electronic devices having the same Internet protocol (IP) address as the second electronic device and different port numbers from the second electronic device.

8. The server of claim 1, wherein the instructions, when executed by the at least one processor indicually or collectively, cause the server to:
   request account information about the one or more external electronic devices from a user account server,
   receive the account information about the one or more external electronic devices from the user account server, and obtain the second call log information based on the account information.

9. An operation method of a server, the method comprising:
- obtaining first call log information including at least one outgoing call made using a call function of a first electronic device by a second electronic device connected to the server;
- determining whether the second electronic device satisfies a first condition for determining that the second electronic device is a spam caller, based on the first call log information;
- based on the first condition being satisfied, transmitting, to the second electronic device, a scan request for requesting a nearby device scanning;
- receiving, from the second electronic device, nearby device information about one or more external electronic devices located around the second electronic device, after transmitting the scan request, wherein the nearby device information includes one or more media access control (MAC) addresses of the one or more external electronic devices;
- obtaining second call log information about the one or more external electronic devices; and
- determining at least one of the one or more external electronic devices or the second electronic device as a spam caller, based on the second call log information.

10. The operation method of claim 9, wherein determining whether the second electronic device satisfies the first condition comprises:
- determining that the first condition is satisfied for the second electronic device, based on the second electronic device being a secondary device using the call function of the first electronic device through the server, and a number of outgoing calls made using the call function of the first electronic device by the second electronic device and/or a number of outgoing calls made by the first electronic device being greater than a given threshold.

11. The operation method of claim 9, wherein determining the at least one of the one or more external electronic devices or the second electronic device as a spam caller comprises:
- determining whether at least one of the one or more external electronic devices satisfies the first condition, based on the second call log information, and
- determining at least one external electronic device and/or the second electronic device that satisfy the first condition as spam callers.

12. The operation method of claim 11, wherein determining whether the at least one of the one or more external electronic devices satisfies the first condition comprises:
- determining that a first external electronic device satisfies the first condition, based on the first external electronic device among the one or more external electronic devices being a secondary device using a call function of a corresponding primary device through the server, and a number of outgoing calls made using the call function of the corresponding primary device by the first external electronic device and/or a number of outgoing calls made by the corresponding primary device being greater than a given threshold.

13. The operation method of claim 9, wherein searching for the one or more external electronic devices located around the second electronic device comprises discovering the one or more external electronic devices based on location information about the second electronic device, and
- wherein the location information includes at least one of a cell identifier (ID), an address of an access point accessed by the second electronic device, or a global positioning system (GPS) location.

14. The operation method of claim 9, wherein searching for the one or more external electronic devices located around the second electronic device comprises:
- identifying an access point accessed by the second electronic device, and
- discovering the one or more external electronic devices accessing the server through the identified access point.

15. The operation method of claim 9, wherein searching for the one or more external electronic devices located around the second electronic device comprises discovering the one or more external electronic devices having the same Internet protocol (IP) address as the second electronic device and different port numbers from the second electronic device.

16. The operation method of claim 9, wherein obtaining the second call log information about the one or more external electronic devices comprises:
- requesting account information about the one or more external electronic devices from a user account server,
- receiving the account information about the one or more external electronic devices from the user account server, and
- obtaining the second call log information based on the account information.

* * * * *